United States Patent
Tomatsu

(10) Patent No.: US 12,466,391 B2
(45) Date of Patent: Nov. 11, 2025

(54) VEHICLE, MOTION MANAGER, AND MOTION REQUEST CORRECTION METHOD

(71) Applicant: TOYOTA JIDOSHA KABUSHIKI KAISHA, Toyota (JP)

(72) Inventor: Nobuyuki Tomatsu, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 189 days.

(21) Appl. No.: 18/173,564

(22) Filed: Feb. 23, 2023

(65) Prior Publication Data
US 2023/0286493 A1 Sep. 14, 2023

(30) Foreign Application Priority Data
Mar. 14, 2022 (JP) .................. 2022-038963

(51) Int. Cl.
| | |
|---|---|
| *B60W 30/02* | (2012.01) |
| *B60W 40/13* | (2012.01) |
| *B60W 60/00* | (2020.01) |
| *G01C 21/34* | (2006.01) |

(52) U.S. Cl.
CPC ............ *B60W 30/02* (2013.01); *B60W 40/13* (2013.01); *G01C 21/3461* (2013.01); *B60W 2040/1315* (2013.01); *B60W 60/001* (2020.02); *B60W 2520/00* (2013.01); *B60W 2530/10* (2013.01); *B60W 2540/221* (2020.02)

(58) Field of Classification Search
CPC ............... B60W 30/02; B60W 40/13; B60W 2540/221; B60W 60/001; B60W 2040/1315; B60W 2520/00; B60W 2530/10; G01C 21/3461
USPC ........................................................ 701/124
See application file for complete search history.

(56) References Cited

U.S. PATENT DOCUMENTS

| | | | | |
|---|---|---|---|---|
| 5,929,388 | A * | 7/1999 | Uehara | G01G 19/08 |
| | | | | 177/136 |
| 10,132,674 | B2 * | 11/2018 | Watanabe | G01G 19/08 |
| 10,151,661 | B2 * | 12/2018 | Regan | G01M 1/125 |

(Continued)

FOREIGN PATENT DOCUMENTS

| | | | | |
|---|---|---|---|---|
| CA | 3030355 A1 * | 7/2019 | | G01L 25/00 |
| DE | 102011080245 A1 * | 2/2013 | | G01G 19/12 |

(Continued)

OTHER PUBLICATIONS

Sierra-Garcia, J. Enrique, and MatildeSantos. "MechatronicModellingofIndustrialAGVs:AComplexSystemArchitecture." Complexity2020.2020(2020): 1-21.Web. (Year: 2020).*

*Primary Examiner* — Ramya P Burgess
*Assistant Examiner* — Keith A von Volkenburg
(74) *Attorney, Agent, or Firm* — Oliff PLC

(57) ABSTRACT

A vehicle includes a driving support system that sets an action plan for driving support of the vehicle, a motion manager including one or more processors that arbitrate a plurality of action plans set by the driving support system, and an actuator system to which a motion request generated using a result of arbitration by the motion manager is distributed. The one or more processors of the motion manager predicts a total weight of the vehicle and a position of a center of gravity of the vehicle, and correct the motion request based on the predicted total weight and the predicted position of the center of gravity.

12 Claims, 14 Drawing Sheets

(56) References Cited

U.S. PATENT DOCUMENTS

| | | | | |
|---|---|---|---|---|
| 10,479,418 | B1 * | 11/2019 | Patel | G07F 17/12 |
| 10,486,825 | B2 * | 11/2019 | Gowda | G06F 3/14 |
| 11,001,392 | B1 * | 5/2021 | Kern | G01G 23/002 |
| 12,195,046 | B2 * | 1/2025 | Switkes | B60W 40/10 |
| 2006/0217864 | A1 * | 9/2006 | Johnson | B60N 2/1817 |
| | | | | 701/45 |
| 2009/0092284 | A1 * | 4/2009 | Breed | B60N 2/0028 |
| | | | | 382/103 |
| 2009/0319165 | A1 * | 12/2009 | Eadie | G01M 1/125 |
| | | | | 701/124 |
| 2019/0056736 | A1 * | 2/2019 | Wood | G05D 1/0246 |
| 2020/0070849 | A1 | 3/2020 | Suzuki et al. | |
| 2022/0034705 | A1 * | 2/2022 | Kuck | G01G 19/4144 |

FOREIGN PATENT DOCUMENTS

| | | | | |
|---|---|---|---|---|
| DE | 102018117352 A1 * | 1/2020 | | G01G 19/08 |
| JP | 3345346 B2 * | 11/2002 | | |
| JP | 2005-215771 A | 8/2005 | | |
| JP | 2010-253978 A | 11/2010 | | |
| JP | 2012-171404 A | 9/2012 | | |
| JP | 2012202882 A * | 10/2012 | | |
| JP | 2014109549 A * | 6/2014 | | |
| JP | 2020-032894 A | 3/2020 | | |
| JP | 2022-9425 A | 1/2022 | | |
| WO | 2018/070475 A1 | 4/2018 | | |
| WO | 2020/177871 A1 | 9/2020 | | |

* cited by examiner

SET TRAVELING ROUTE

VEHICLE, MOTION MANAGER, AND MOTION REQUEST CORRECTION METHOD

CROSS-REFERENCE TO RELATED APPLICATION

This application claims priority to Japanese Patent Application No. 2022-038963 filed on Mar. 14, 2022, incorporated herein by reference in its entirety.

BACKGROUND

1. Technical Field

The present disclosure relates to a vehicle, a motion manager, and a motion request correction method.

2. Description of Related Art

For example, the information processing device described in Japanese Unexamined Patent Application Publication No. 2020-032894 (JP 2020-032894 A) receives motion control amounts in a front-rear direction and a lateral direction from a plurality of driving support applications. Then, the information processing device arbitrates requests to be output to actuators based on the received motion control amounts.

SUMMARY

As described above, the information processing device described in JP 2020-032894 A arbitrates the requests to be output to the actuators based on the motion control amounts received from the driving support applications. However, JP 2020-032894 A does not take into consideration that the total weight of a vehicle and the position of the center of gravity of the vehicle vary depending on the arrangement and weight of each of the pieces of cargo and occupants present in the vehicle. When the total weight of the vehicle and the position of the center of gravity of the vehicle vary, it is conceivable that a traveling state of the vehicle based on the requests will change from a normal state where the total weight and the center of gravity are as expected. Therefore, it is desired to stabilize the traveling state of the vehicle based on the driving support applications (system).

The present disclosure provides a vehicle, a motion manager, and a motion request correction method capable of stabilizing a traveling state of a vehicle based on a driving support system.

A vehicle according to a first aspect of the present disclosure includes a driving support system configured to set an action plan for driving support of vehicle, a motion manager including one or more processors configured to arbitrate a plurality of action plans set by the driving support system, and an actuator system to which a motion request generated using a result of arbitration by the motion manager is distributed. The one or more processors of the motion manager are configured to predict at least one of a total weight of the vehicle and a position of a center of gravity of the vehicle, and correct the motion request based on at least one of the predicted total weight and the predicted position of the center of gravity such that an influence of the total weight and the position of the center of gravity on traveling of the vehicle is reduced.

In the first aspect, as described above, the motion manager predicts at least one of the total weight of the vehicle and the position of the center of gravity of the vehicle, and corrects the motion request based on at least one of the predicted total weight and the predicted position of the center of gravity such that an influence of the total weight and the position of the center of gravity on traveling of the vehicle is reduced. Therefore, when at least one of the total weight of the vehicle and the position of the center of gravity of the vehicle varies, it is possible to reduce the occurrence of the influence on the traveling of the vehicle by correcting the motion request. As a result, the traveling state of the vehicle when the total weight of the vehicle and the position of the center of gravity of the vehicle vary can be reduced from changing from a normal traveling state of the vehicle. This makes it possible to stabilize the traveling state of the vehicle based on the driving support system.

In the first aspect, the one or more processors of the motion manager may predict at least one of the total weight and the position of the center of gravity when the vehicle travels at a point where the influence on the traveling of the vehicle is reduced. With this configuration, it is possible to reduce uncertainty in predicting at least one of the total weight and the position of the center of gravity due to the variation in the arrangement of, for example, cargo while traveling at a point where the influence on traveling is relatively large.

In the first aspect, the one or more processors of the motion manager may set a travel route to a destination such that the point where the influence is reduced is included in the travel route. With this configuration, it is possible to travel a route that allows accurate prediction of at least one of the total weight and the position of the center of gravity.

In the first aspect, the vehicle may further include a vehicle body at which a cargo compartment is formed in which at least one piece of cargo is accommodated, and a first vehicle-side communication device provided in the cargo compartment. The first vehicle-side communication device may communicate with a first cargo-side communication device attached to the piece of cargo, and the one or more processors of the motion manager may predict an arrangement of the piece of cargo in the cargo compartment based on a communication state between the first cargo-side communication device and the first vehicle-side communication device, and predict at least one of the total weight and the position of the center of gravity based on the predicted arrangement of the piece of cargo. With this configuration, at least one of the total weight and the position of the center of gravity can be easily predicted by using the first cargo-side communication device and the first vehicle-side communication device.

In the first aspect, the cargo compartment may accommodate a plurality of pieces of cargo to each of which the first cargo-side communication device is attached. The first vehicle-side communication device may acquire, through the first cargo-side communication device, information indicating that the first cargo-side communication devices of the pieces of cargo that are adjacent to each other communicate with each other. With this configuration, based on the fact that the first cargo-side communication devices of the pieces of cargo that are adjacent to each other are communicating with each other, it is possible to easily acquire the position information of the first cargo-side communication device that does not directly communicate with the first vehicle-side communication device from among the adjacent first cargo-side communication devices.

In the first aspect, the vehicle may further include a second vehicle-side communication device configured to communicate with a second cargo-side communication device attached to the piece of cargo. The second vehicle-side communication device may acquire, through the second cargo-side communication device, information indicating the weight of the piece of cargo to which the second cargo-side communication device is attached, and the one or more processors of the motion manager may predict at least one of the total weight and the position of the center of gravity based on the predicted arrangement of the piece of cargo and the acquired information indicating the weight of the piece of cargo. With this configuration, at least one of the total weight of the vehicle and the position of the center of gravity of the vehicle can be more easily predicted based on the information indicating the weight of the piece of cargo acquired by the second vehicle-side communication device.

In the first aspect, the vehicle may further include a vehicle body at which a cargo compartment is formed in which a piece of cargo is accommodated, and a camera provided in the cargo compartment. The camera may read position information of the piece of cargo and a code attached to the piece of cargo and indicating weight information of the piece of cargo, and the one or more processors of the motion manager may predict at least one of the total weight and the position of the center of gravity based on the position information of the piece of cargo acquired by the camera and the weight information acquired by the camera from the code. With this configuration, it is possible for the camera to acquire both the position information of the piece of cargo and the weight information of the piece of cargo. As a result, it is possible to easily reduce an increase in the number of parts.

In the first aspect, the vehicle may further include a vehicle body at which a cargo compartment is formed in which a piece of cargo is accommodated, and a first weight sensor provided in the cargo compartment. The first weight sensor may detect a weight of the piece of cargo accommodated in the cargo compartment, and the one or more processors of the motion manager may predict at least one of the total weight and the position of the center of gravity based on the weight of the piece of cargo detected by the first weight sensor. With this configuration, the weight information of the piece of cargo can be acquired by the first weight sensor without attaching a code or the like indicating the weight of the piece of cargo to the piece of cargo. As a result, since it is not necessary to attach a code or the like indicating the weight of the piece of cargo to the piece of cargo, the user's labor can be reduced.

In the first aspect, the vehicle may further include a seat, and a second weight sensor provided in the seat. The one or more processors of the motion manager may predict at least one of the total weight and the position of the center of gravity based on a weight detected by the second weight sensor. With this configuration, at least one of the total weight and the position of the center of gravity can be predicted in consideration of the weight applied to the seat. As a result, it is possible to predict at least one of the total weight and the position of the center of gravity in consideration of the weight of the occupant sitting in the seat and the weight of the piece of cargo placed on the seat. Thereby, at least one of the total weight and the position of the center of gravity can be predicted more accurately.

In the first aspect, the motion manager may determine whether the position of the center of gravity of the vehicle is displaced with respect to a center of the vehicle, and add, upon determining that the position of the center of gravity is displaced with respect to the center, a correction value for reducing a moment of inertia caused by the displacement of the center of gravity to the motion request. With this configuration, it is possible to reduce the traveling state of the vehicle from becoming unstable due to the moment of inertia caused by the displacement of the center of gravity of the vehicle.

In the first aspect, the one or more processors of the motion manager may determine whether the position of the center of gravity of the vehicle is displaced at least in a front-rear direction with respect to a center of the vehicle, and correct, upon determining that the position of the center of gravity is displaced in one of a front and a rear with respect to the center, the motion request such that a braking force applied to a wheel of the one of the front and the rear of the vehicle is increased compared to when the center of gravity is located at the center. Here, when the center of gravity of the vehicle is positioned at one of the front and the rear of the vehicle, the wheel of the other of the front and the rear of the vehicle is likely to be locked. Therefore, it is possible to reduce the traveling state of the vehicle from becoming abnormal due to an increase in the driving force of the other of the front wheel and the rear wheel while one of the front wheel and the rear wheel is locked.

In the first aspect, the vehicle may further include an angular acceleration sensor configured to detect the angular acceleration of the vehicle. The one or more processors of the motion manager may correct the motion request based on the angular acceleration detected by the angular acceleration sensor. With this configuration, the motion request can be corrected more appropriately based on the angular acceleration detected by the angular acceleration sensor.

A motion manager according to a second aspect of the present disclosure includes one or more processors configured to arbitrate a plurality of action plans for driving support of a vehicle set by a driving support system of the vehicle, calculate a motion request based on a result of arbitration, distribute the motion request to an actuator system of the vehicle, predict at least one of a total weight of the vehicle and a position of a center of gravity of the vehicle, and correct the motion request based on at least one of the predicted total weight and the predicted position of the center of gravity such that an influence of the total weight and the position of the center of gravity on traveling of the vehicle is reduced.

As described above, the motion manager according to the second aspect predicts at least one of the total weight of the vehicle and the position of the center of gravity of the vehicle, and corrects the motion request based on at least one of the predicted total weight and the predicted position of the center of gravity such that the influence of the total weight and the position of the center of gravity on the traveling of the vehicle is reduced. Therefore, when at least one of the total weight of the vehicle and the position of the center of gravity of the vehicle varies, it is possible to reduce the occurrence of the influence on the traveling of the vehicle by correcting the motion request. As a result, the traveling state of the vehicle when the total weight of the vehicle and the position of the center of gravity of the vehicle vary can be reduced from changing from a normal traveling state of the vehicle. Thus, it is possible to provide the motion manager capable of stabilizing the traveling state of the vehicle based on the driving support system.

A motion request correction method according to a third aspect of the present disclosure includes arbitrating a plurality of action plans for driving support of a vehicle set by a driving support system of the vehicle, calculating a motion request to be distributed to an actuator system of the vehicle based on a result of arbitration, predicting at least one of a total weight of the vehicle and a position of a center of gravity of the vehicle, correcting the calculated motion request based on the at least one of the total weight and the position of the center of gravity which has been predicted such that an influence of the total weight and the position of the center of gravity on traveling of the vehicle is reduced, and distributing the corrected motion request to the actuator system.

In the motion request correction method according to the third aspect, as described above, based on at least one of the predicted total weight and the predicted position of the center of gravity, the motion request is corrected such that the influence of the total weight and the position of the center of gravity on traveling of the vehicle is reduced. Therefore, when at least one of the total weight of the vehicle and the position of the center of gravity of the vehicle varies, it is possible to reduce the occurrence of the influence on the traveling of the vehicle by correcting the motion request. As a result, the traveling state of the vehicle when the total weight of the vehicle and the position of the center of gravity of the vehicle vary can be reduced from changing from a normal traveling state of the vehicle. Thus, it is possible to provide the motion request correction method capable of stabilizing the traveling state of the vehicle based on the driving support system.

With each aspect of the present disclosure, it is possible to stabilize the traveling state of the vehicle based on the driving support system.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein.

DETAILED DESCRIPTION OF EMBODIMENTS

First Embodiment

Figure 1:
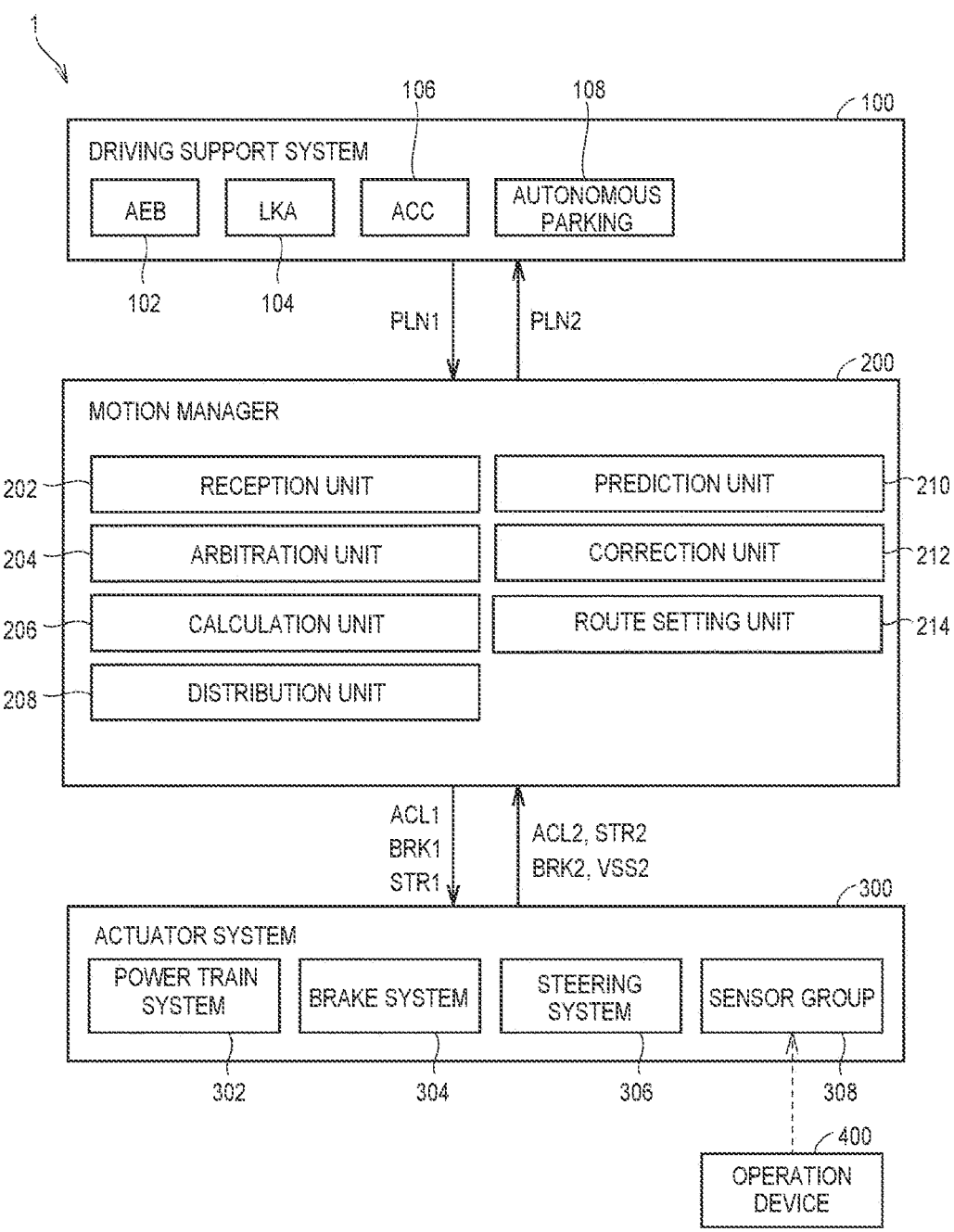
FIG. 1 is a diagram illustrating a configuration of a vehicle according to a first embodiment.

A first embodiment of the present disclosure will be described in detail below with reference to the drawings. The same or corresponding parts in the drawings are denoted by the same reference numerals, and the description thereof will not be repeated.

Vehicle Configuration

FIG. 1 is a diagram illustrating an example of the configuration of a vehicle 1. The vehicle 1 may be a vehicle having a configuration capable of realizing the functions of a driving support system 100, which will be described below. The vehicle 1 may be, for example, a vehicle with an engine as a drive source, an electric vehicle with an electric motor as a drive source, or a hybrid vehicle that is equipped with an engine and an electric motor and uses at least one of them as a drive source.

The vehicle 1 includes a driving support system 100 having functions related to driving support for the vehicle 1, a motion manager 200, and an actuator system 300.

The driving support system 100 is configured to realize various functions for supporting the driving of the vehicle 1, including at least one of steering control, drive control, and braking control of the vehicle 1, by executing implemented applications. The driving support system 100 includes a plurality of applications. Applications implemented in the driving support system 100 include, for example, an application that realizes the function of an autonomous driving system (AD), an application that realizes the function of an autonomous parking system, an application (hereinafter referred to as an ADAS application) that realizes the function of an advanced driver assist system (ADAS), and the like.

Examples of the ADAS application include at least one of an application that realizes a function of follow-up traveling (adaptive cruise control (ACC), or the like) that travels while constantly keeping a distance with a preceding vehicle, an application that realizes a functions of an auto speed limiter (ASL) that recognizes a vehicle velocity limit and maintains an upper limit value of velocity of a subject vehicle, an application that realizes a function of a lane maintenance assistance (a lane keeping assist (LKA), a lane tracing assist (LTA), or the like) that that executes maintenance of a lane in which a vehicle travels, an application that realizes a functions of a collision damage mitigation braking (an autonomous emergency braking (AEB), a pre-crash safety (PCS), or the like) that cause the vehicle to automatically brake to reduce the damage of a collision, and an application that realizes a function of a lane departure warning (a lane departure warning (LDW), a lane departure alert (LDA), or the like) that warns of lane departure of the vehicle 1.

In the driving support system 100 illustrated in FIG. 1, for example, an AEB 102, an LKA 104, an ACC 106, and autonomous parking 108 are included as applications.

Each application included in the driving support system 100 outputs, to a motion manager 200, a request for an action plan that secures the marketability (function) of the application alone based on vehicle surrounding situation information and driver assistance requests or the like, acquired (input) from a plurality of sensors (not illustrated). The each of the sensors includes, for example, a vision sensor such as a front-facing camera, a radar, a light detection and ranging (LiDAR), or a position detection device.

The front-facing camera is placed, for example, on the back side of the rear-view mirror in the vehicle cabin, and is used to capture an image of the front of the vehicle. A radar is a distance measuring device that irradiates an object with short-wavelength radio waves, detects the radio waves returned from the object, and measures the distance and direction to the object. A LiDAR is a distance measuring device that measures distance by irradiating pulsed laser light rays (light rays such as infrared light rays) and counting the time it takes for the laser light rays to reflect off an object and return. The position detection device may include, for example, a global positioning system (GPS) that detects the position of the vehicle 1 using information received from a plurality of satellites orbiting the earth.

Each application acquires vehicle surrounding situation information that integrates the detection results of one or more sensors as recognition sensor information, and also acquires the driver's assistance request via a user interface (not illustrated) such as a switch. For example, each application makes it possible to recognize other vehicles, obstacles, and people around the vehicle by image processing using artificial intelligence (AI) and image processing processors for images and videos around the vehicle acquired by a plurality of sensors.

Further, the action plan includes, for example, a request regarding longitudinal acceleration/deceleration to be generated in the vehicle 1, a request regarding steering angle of the vehicle 1, a request regarding bringing the vehicle 1 to a standstill, and the like.

The request regarding the longitudinal acceleration/deceleration generated in the vehicle 1 includes, for example, an operation request for a power train system 302 and an operation request for a brake system 304.

The request regarding bringing the vehicle 1 to a standstill includes, for example, a request for permitting or prohibiting operation of at least one of the electric parking brake and the parking lock mechanism (both not illustrated).

An electric parking brake limits rotation of a wheel 2 (see FIG. 2) of the vehicle 1, for example, by the operation of an actuator. The electric parking brake may be configured, for example, to limit the rotation of the wheel by operating a brake for parking brakes provided on some of the plurality of wheels 2 provided on the vehicle 1 using an actuator. Alternatively, the electric parking brake may operate an actuator for the parking brake to adjust the hydraulic pressure supplied to the braking device of the brake system 304 to limit wheel rotation by operating the braking device.

The parking lock mechanism limits rotation of an output shaft of the transmission by operating the actuator. The parking lock mechanism, for example, engages a protrusion portion provided at the tip of a parking lock pole of which the position is adjusted by an actuator with a gear (lock gear) tooth provided in connection with a rotation element in the transmission of the vehicle 1. This limits the rotation of the transmission's output shaft and limits the rotation of the wheel 2.

The applications implemented in the driving support system 100 are not particularly limited to the applications described above, and applications that realize other functions may be added. In addition, existing applications may be omitted, and the number of applications to be implemented is not particularly limited.

The motion manager 200 requests the actuator system 300 to move the vehicle 1 according to the action plan set in at least one of the applications of the driving support system 100. A detailed configuration of the motion manager 200 will be described below.

An actuator system 300 is configured to be able to realize the motion requests of the vehicle 1 output from the motion manager 200. The actuator system 300 includes a plurality of types of actuator systems. FIG. 1 illustrates a case where the actuator system 300 includes, for example, the power train system 302, the brake system 304, and a steering system 306 as the plurality of types of actuator systems. The number of actuator systems to which motion is requested by the motion manager 200 is not limited to three as described above, and may be four or more or two or less.

The power train system 302 includes a power train actuator (not illustrated) capable of generating driving force to the wheel 2 of the vehicle 1 and a power train electronic control unit (ECU) (not illustrated) that controls the operation of the power train actuator. The power train actuator described above includes, for example, at least one of an internal combustion engine such as a gasoline engine and a diesel engine, a transmission including a speed changer and a differential, a motor generator that serves as a drive source, a power storage device that stores electric power supplied to the motor generator, a power conversion device that mutually converts power between a motor generator and a power storage device, a power source such as a fuel cell, and the like. The power train ECU controls corresponding equipment to realize motion requests from the motion manager 200 to the corresponding equipment in the power train system 302.

The brake system 304 includes a plurality of braking devices provided, for example, on each wheel of the vehicle 1. The braking device includes, for example, a hydraulic brake such as a disk brake that generates braking force using hydraulic pressure. The braking device may further include, for example, a motor generator that is connected to the wheel and generates regenerative torque. A braking operation of the vehicle 1 using the braking devices is controlled by a brake ECU (not illustrated). The brake ECU is provided with, for example, a control unit (not illustrated) for controlling the brake system 304 separately from the motion manager 200.

The steering system 306 includes, for example, a steering device capable of changing the steering angle of a steered wheel (for example, front wheel) of the vehicle 1, and an ECU (both not illustrated) that controls the operation of the steering device. The steering device includes, for example, a steering wheel that changes the steering angle according to the amount of operation, and an electric power steering (EPS) that can adjust the steering angle by an actuator independently of the operation of the steering wheel. The ECU, which controls the operation of the steering system, controls the operation of the EPS actuators.

In the vehicle 1 having the configuration described above, a request for an action plan that the driving support system 100 set in at least one of a plurality of applications is transmitted as a request signal PLN1 from the driving support system 100 to the motion manager 200, for example.

The request signal PLN1 includes, for example, information about a target (requested) acceleration set as one of action plans in the AEB 102, the ACC 106, or the autonomous parking 108, information about a target (requested) curvature set as one of the action plans in the LKA 104, and the like.

The motion manager 200 sets the motion requested to the vehicle 1 based on the action plan request included in the received request signal PLN1, and requests the actuator system 300 to realize the set motion. That is, the motion manager 200 transmits an operation request to the power train system 302 to the actuator system 300 as a request signal ACL1. The motion manager 200 transmits an operation request to the brake system 304 to the actuator system 300 as a request signal BRK1. Further, the motion manager 200 transmits a request for an operation to the steering system 306 to the actuator system 300 as a request signal STR1.

The request signal ACL1 includes, for example, information on the requested value of the driving torque or driving force, information on the requested shift range, information on how to arbitrate (for example, select the maximum or minimum value, change stepwise, gradually change). The shift range includes, for example, a forward traveling range (hereinafter referred to as "D range" or simply "D") and a reverse traveling range (hereinafter referred to as "R range" or simply "R").

The request signal BRK1 includes, for example, information on the requested value of the braking torque, information on how to arbitrate (for example, whether to change in steps or gradually), information on the execution time of braking (immediate execution or not).

The request signal STR1 includes, for example, a target (requested) steering angle, information as to whether the target steering angle is effective, and information on upper and lower limits of the steering wheel operation assist torque.

An actuator system that receives the corresponding request signal from among the plurality of types of actuator systems that constitute the actuator system 300 is controlled so as to realize the operation request included in the request signal.

An example of the configuration of the motion manager 200 will be described below. As illustrated in FIG. 1, the motion manager 200 includes a reception unit 202, an arbitration unit 204, a calculation unit 206, a distribution unit 208, a prediction unit 210, a correction unit 212, and a route setting unit 214.

The reception unit 202 receives action plan requests output by one or more applications of the driving support system 100.

The arbitration unit 204 arbitrates a plurality of action plan requests received via the reception unit 202 from each application. An example of this arbitration process is to select one action plan from the action plans based on a predetermined selection criterion. Another example of the arbitration process is setting a new action plan based on the action plans. The arbitration unit 204 may further add predetermined information received from the actuator system 300 to arbitrate the action plan requests. Further, the arbitration unit 204 may determine whether to temporarily prioritize the motion of the vehicle 1 determined according to the driver state (for example, operation state to operation device 400) and the vehicle state over the motion of the vehicle 1 corresponding to the action plan determined based on the result of the arbitration.

The calculation unit 206 calculates the motion request based on the result of the arbitration in the arbitration unit 204 for the action plan request and the motion of the vehicle 1 determined based on the result of the arbitration. This motion request is a physical quantity for controlling at least one actuator system of the actuator systems 300, and includes a physical quantity different from the physical quantity of the action plan request. For example, when the action plan request (first request) is longitudinal acceleration, the calculation unit 206 calculates values obtained by converting the acceleration into drive force or drive torque as the motion request (second request).

The distribution unit 208 distributes (transmits) the motion request calculated by the calculation unit 206 to at least one actuator system of the actuator systems 300. The distribution unit 208 distributes the motion request only to the power train system 302, for example, when acceleration of the vehicle 1 is requested. Alternatively, the distribution unit 208 appropriately distributes the motion request to the power train system 302 and the brake system 304 to realize the target deceleration when the vehicle 1 is requested to decelerate. The distribution unit 208 is an example of the "transmitter" that transmits motion requests to the actuator system 300.

Information about the state of the power train system 302 is transmitted from the power train system 302 of the actuator system 300 to the motion manager 200 as a signal ACL2. The information about the state of the power train system 302 includes, for example, information on the operation of the accelerator pedal, information on the actual driving torque or actual driving force of the power train system 302, information on the actual shift range, information on the upper and lower limits of the driving torque, information on the upper and lower limits of the driving force, information on the reliability of the power train system 302, and the like.

Information about the state of the brake system 304 is transmitted from the brake system 304 of the actuator system 300 to the motion manager 200 as a signal BRK2. The information about the state of the brake system 304 includes, for example, information on the operation of the brake pedal, information on the braking torque requested by a driver, information on the requested value of the braking torque after arbitration, information on the actual braking torque after arbitration, information on the reliability of the brake system 304, and the like.

Information about the state of the steering system 306 is transmitted from the steering system 306 of the actuator system 300 to the motion manager 200 as a signal STR2. The information about the state of the steering system 306 includes, for example, information on the reliability of the steering system 306, information on whether the driver is gripping the steering wheel, information on the torque with which the steering wheel is operated, and information on the rotation angle of the steering wheel.

The actuator system 300 also includes a sensor group 308 in addition to the power train system 302, the brake system 304, and the steering system 306 described above.

The sensor group 308 includes a plurality of sensors that detect the behavior of the vehicle 1. The sensor group 308 includes, for example, a longitudinal G sensor 308a (see FIG. 2) that detects vehicle body acceleration in a front-rear direction of the vehicle 1, a lateral G sensor 308b (see FIG. 2) that detects vehicle body acceleration in a right-left direction of the vehicle 1, a wheel speed sensor 308c (see FIG. 2) provided for each wheel for detecting the wheel speed, and a yaw rate sensor 308d (see FIG. 2) that detects the angular velocity of the rotation angle (yaw angle) in a yaw direction. Although only one wheel speed sensor 308c is illustrated for simplification, it is actually provided for each of a plurality of wheels 2. The sensor group 308 transmits information including the detection results of the sensors to the motion manager 200 as a signal VSS2. That is, the signal VSS2 includes, for example, the detection value of the longitudinal G sensor 308a, the detection value of the lateral G sensor 308b, the detection value of the wheel speed sensor 308c of each wheel 2, the detection value of the yaw rate sensor 308d, and information on the reliability of each sensor. The yaw rate sensor 308d is an example of the "angular acceleration sensor" of the present disclosure.

The operation device 400 includes, for example, operation members such as a shift lever for changing the shift range and a brake pedal, which are operated by a user who is the driver. The position of the shift lever is detected, for example, by a detection device that detects the position of the shift lever. Further, the position of the brake pedal is detected by a detection device that detects the amount of depression of the brake pedal. The sensor group 308 further includes various sensing devices as described above.

Upon receiving various signals from the actuator system 300, the motion manager 200 transmits predetermined information to the driving support system 100 as a signal PLN2. The predetermined information includes a fail class indicating an operation state including the presence or absence of abnormalities in various actuator systems.

Figure 2:
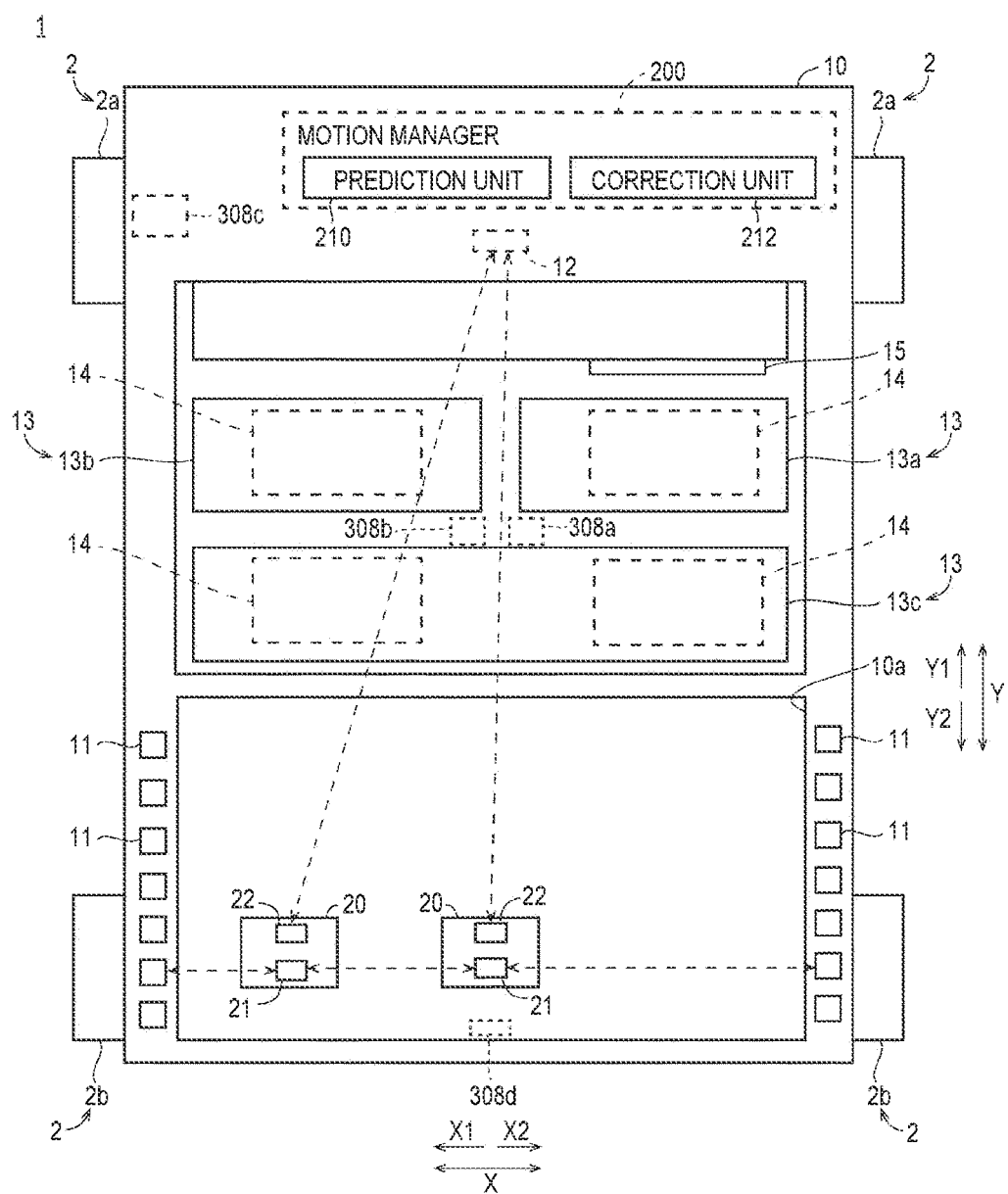
FIG. 2 is a diagram illustrating a configuration of a vehicle (vehicle body) according to the first embodiment.

As illustrated in FIG. 2, the vehicle 1 includes a vehicle body 10, a communication device 11, a communication device 12, a seat 13, a seat weight sensor 14, and a steering wheel 15. Further, the communication device 11 and the communication device 12 are examples of the "first vehicle-side communication device" and the "second vehicle-side communication device", respectively, in the present disclosure. In addition, the seat weight sensor 14 is an example of the "second weight sensor" of the present disclosure.

The vehicle body 10 is formed with a cargo compartment 10a in which at least one piece of cargo 20 is accommodated. In the present embodiment, a plurality of pieces of cargo 20 (two in FIG. 2) are accommodated in the cargo compartment 10a. The cargo compartment 10a is provided on the rear side (Y2 side in FIG. 2) of the vehicle body 10.

A communication device 21 and a communication device 22 are attached to each of the pieces of cargo 20. In addition, the communication device 21 and the communication device 22 are examples of the "first cargo-side communication device" and the "second cargo-side communication device" of the present disclosure, respectively.

The communication device 11 of the vehicle 1 is provided in the cargo compartment 10a. Specifically, in each of the right side (X2 side in FIG. 2) and the left side (X1 side in FIG. 2) of the space where the piece of cargo 20 is placed in the cargo compartment 10a, a plurality of communication devices 11 are arranged in the front-rear direction (Y direction in FIG. 2). The communication device 11 can communicate with the communication device 21 attached to the piece of cargo 20. The communication devices 21 that are different from each other can communicate with each other.

Here, in the first embodiment, the communication device 11 of the vehicle 1 acquires, through the communication device 21, information indicating that the communication devices 21 of the pieces of cargo 20 adjacent to each other are communicating with each other. Specifically, the communication device 11 acquires the information described above from the communication device 21 attached to the piece of cargo 20 closer to the communication device 11 from among the communication devices 21 of the pieces of cargo 20 that are adjacent to each other. The communication device 11 may acquire the information described above from both of the communication devices 21 adjacent to each other, or may acquire the information from the communication device 21 farther from the communication device 11 from among the communication devices 21 adjacent to each other.

In addition, the communication device 21 of the piece of cargo 20 transmits the ID information of the communication device 22 attached to the piece of same cargo 20 to the communication device 11 of the vehicle 1.

The communication device 12 of the vehicle 1 can communicate with the communication device 22 attached to the piece of cargo 20. The communicable distance of the communication device 12 is longer than the communicable distance of the communication device 11. The communication device 12 is arranged in the front side of the vehicle body 10, for example. The arrangement position of the communication device 12 is not limited to this.

The communication device 12 of the vehicle 1 acquires, through the communication device 22, information indicating the weight of the piece of cargo 20 to which the communication device 22 is attached. In this case, the communication device 22 transmits its own ID information to the communication device 12 together with information indicating the weight of the piece of cargo 20 to which the communication device 22 is attached. The communication device 22 may transmit, to the communication device 12, the ID information of the piece of cargo 20 adjacent to the piece of cargo 20 to which the communication device 22 is attached, the ID information of the adjacent wall surface of the cargo compartment 10a, and the like.

In addition, the seat 13 includes a driver's seat 13a, a passenger's seat 13b, and a rear seat 13c. The seat weight sensor 14 is provided on the seat 13. Specifically, the seat weight sensor 14 is provided in each of the driver's seat 13a, the passenger's seat 13b, and the rear seat 13c. The seat weight sensor 14 detects the weight of an occupant sitting in each seat 13 or a piece of cargo placed thereon. A plurality of seat weight sensors 14 may be provided in the rear seat 13c.

The steering wheel 15 is configured to be operable by the occupant. The traveling direction (steering angle, or the like) of the vehicle 1 is controlled by the occupant's operation of the steering wheel 15.

The configuration of the devices mounted on the vehicle 1 and the configuration of the motion manager 200 described above are examples, and addition, replacement, change, omission, and the like can be made as appropriate. In addition, the functions of each device can be appropriately integrated into one device or distributed to a plurality of devices and executed.

In the vehicle 1 having the configuration as described above, the total weight of the vehicle 1 and the position of the center of gravity G of the vehicle 1 may vary depending on the arrangement and weight of the pieces of cargo and passengers present in the vehicle 1. In a typical vehicle, when the total weight of the vehicle and the position of the center of gravity of the vehicle vary, it is conceivable that the traveling state of the vehicle will change based on the motion request (traveling state becomes unstable) from a normal state (when the total weight and the center of gravity are as expected). Therefore, a vehicle 1 capable of stabilizing the traveling state of the vehicle 1 based on the driving support system 100 is desired.

Therefore, in the first embodiment, the motion manager 200 predicts the total weight of the vehicle 1 and the position of the center of gravity G (see FIG. 3) of the vehicle 1, and based on the predicted total weight and the position of the center of gravity G, the motion manager 200 corrects motion requests to the actuator system 300 (see FIG. 1) such that the influence of the total weight and the position of the center of gravity G on the traveling of the vehicle 1 is reduced. Specifically, the motion manager 200 (correction unit 212) corrects motion requests so as to reduce the influence on the traveling state of the vehicle 1 caused by the difference between the predicted total weight and position of the center of gravity G and the total weight and position of the center of gravity G of the vehicle 1 under normal conditions (when the total weight and position of the center of gravity G are as expected).

The motion manager 200 (prediction unit 210) determines whether the position of the center of gravity G of the vehicle 1 is displaced with respect to the center C (see FIG. 3) of the vehicle. Specifically, the motion manager 200 (prediction unit 210) determines whether the position of the center of gravity G of the vehicle 1 is displaced with respect to the center C of the vehicle in the front-rear direction (Y direction) and the right-left direction (X direction).

In the first embodiment, when it is determined that the position of the center of gravity G is displaced forward (Y1 side) or rearward (Y2 side) with respect to the center C, the motion manager 200 (correction unit 212) corrects the motion requests such that the braking force applied to one of the front wheel 2 and the rear wheel 2 of the vehicle 1 is increased compared to when the center of gravity G is located at the center C.

Figure 3:
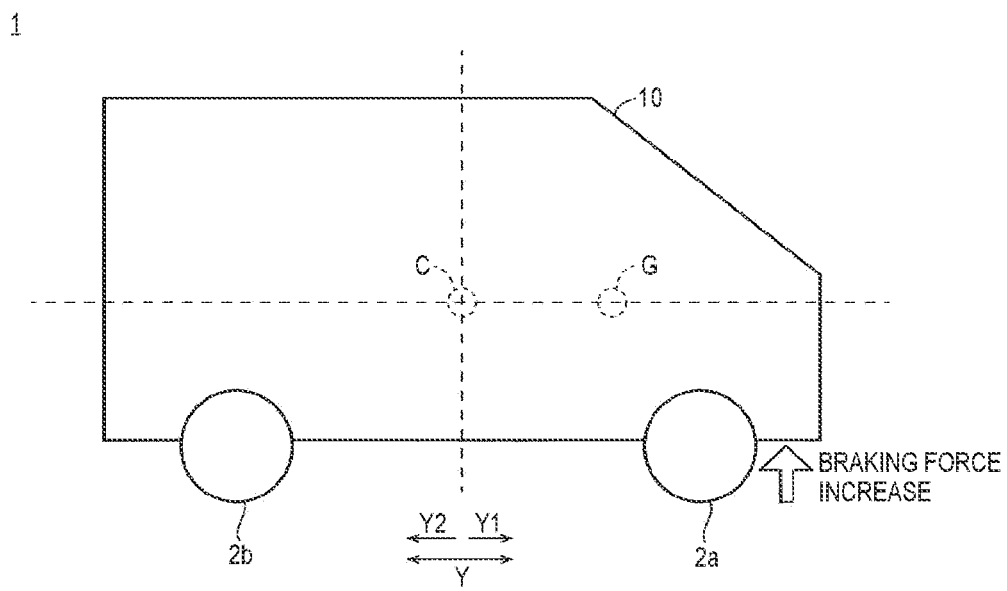
FIG. 3 is a diagram illustrating a state in which a center of gravity of the vehicle is on a front side.
Figure 4:
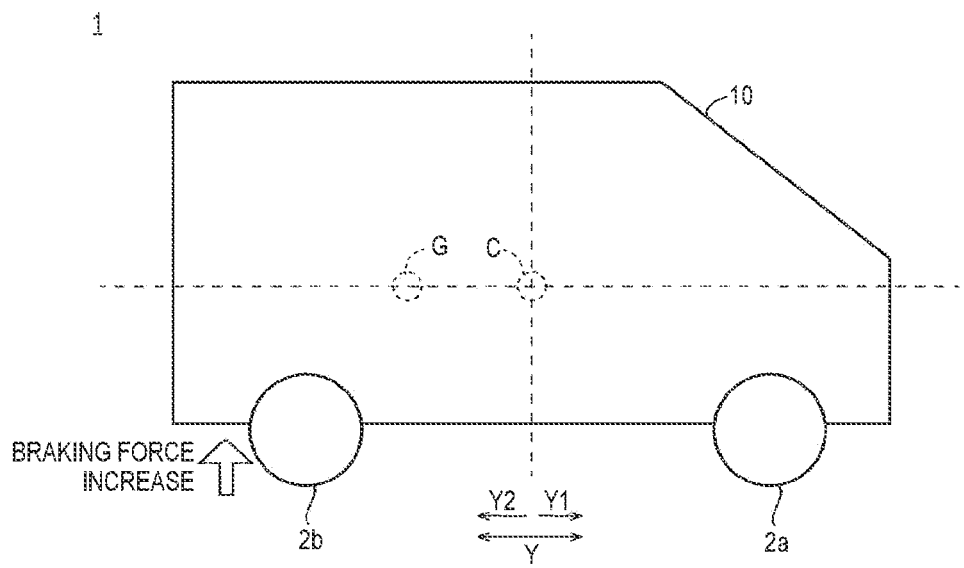
FIG. 4 is a diagram illustrating a state in which the center of gravity of the vehicle is on a rear side.

In other words, as illustrated in FIG. 3, when it is determined that the position of the center of gravity G is displaced forward (Y1 side) with respect to the center C, the motion manager 200 (correction unit 212) corrects the motion requests such that the braking force applied to a front wheel 2*a* is increased compared to when the center of gravity G is located at the center C. Furthermore, as illustrated in FIG. 4, when the position of the center of gravity G is displaced rearward (Y2 side) with respect to the center C, the motion manager 200 (correction unit 212) corrects the motion requests such that the braking force applied to a rear wheel 2*b* is increased compared to when the center of gravity G is located at the center C. In this case, the motion manager 200 (correction unit 212) corrects the motion request to the brake system 304 (see FIG. 1).

Figure 5:
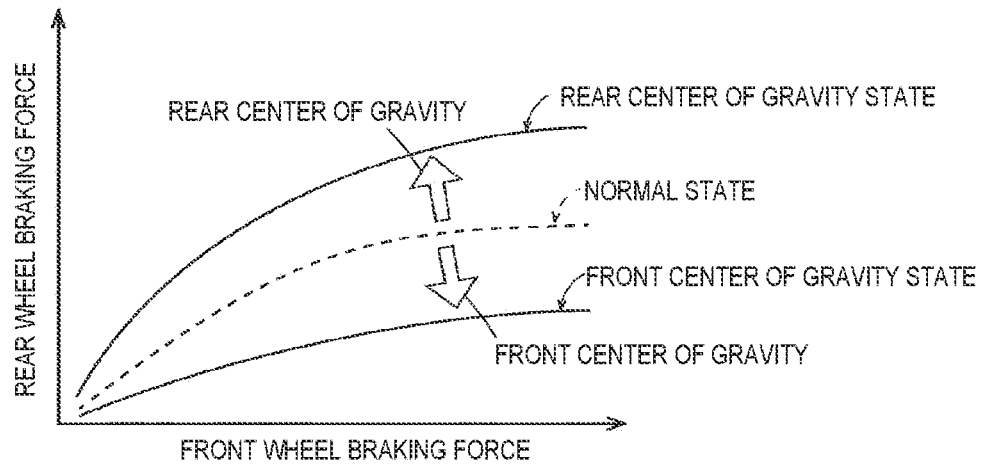
FIG. 5 is a diagram illustrating magnitude of braking force of a wheel corresponding to a position of the center of gravity of the vehicle.

Specifically, as illustrated in FIG. 5, when it is determined that the position of the center of gravity G is displaced forward with respect to the center C, the motion manager 200 (correction unit 212) corrects the motion request such that the ratio of the braking force of the front wheel 2*a* to the braking force of the rear wheel 2*b* is greater than when the center of gravity G is located at the center C.

Further, when it is determined that the position of the center of gravity G is displaced rearward with respect to the center C, the motion manager 200 (correction unit 212) corrects the motion request such that the ratio of the braking force of the rear wheel 2*b* to the braking force of the front wheel 2*a* is greater than when the center of gravity G is located at the center C.

The motion manager 200 (correction unit 212) may correct the driving force of the wheel 2 by correcting the motion request to the power train system 302 (see FIG. 1) instead of correcting the braking force of the wheel 2, or may correct both the braking force and the driving force of the wheel 2.

Further, in the first embodiment, when it is determined that the position of the center of gravity G is displaced with respect to the center C, the motion manager 200 (correction unit 212) adds a correction value to the motion request to reduce the moment of inertia caused by the displacement of the center of gravity G. A specific description will be given with reference to FIGS. 6 and 7.

Figure 6:
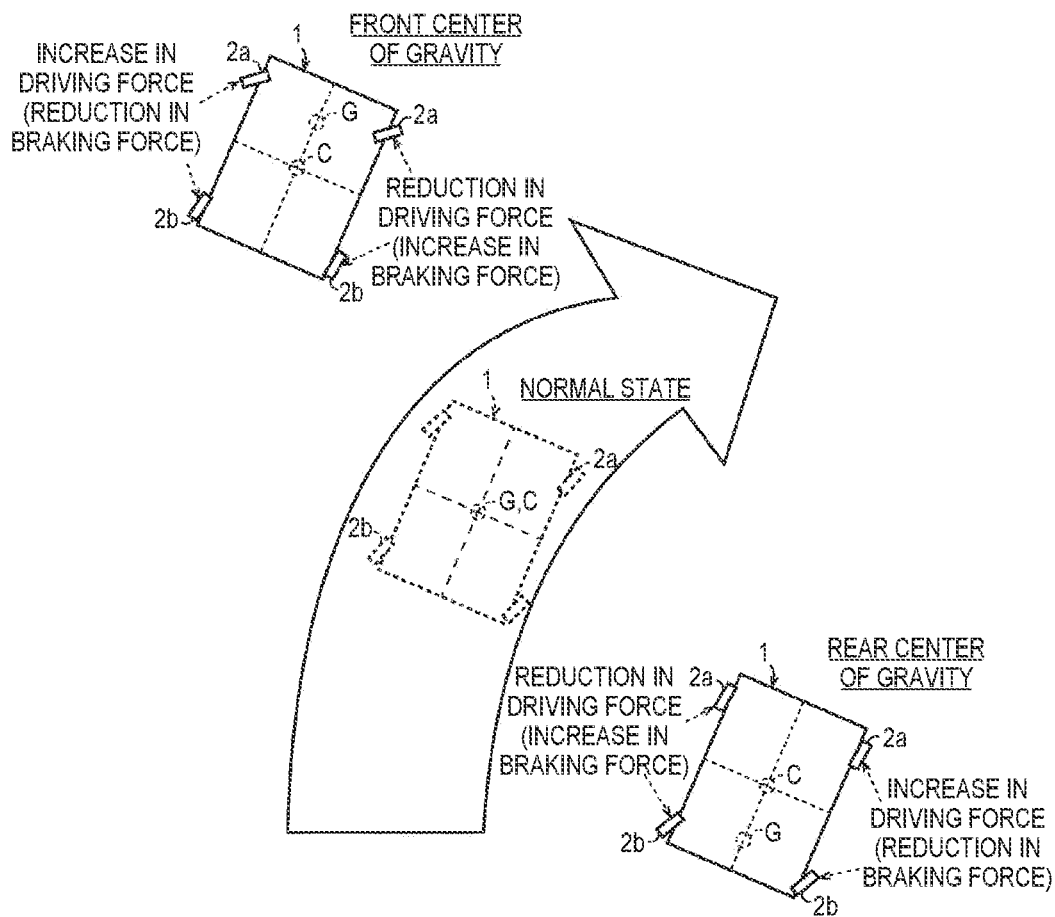
FIG. 6 is a diagram illustrating wheel control when the center of gravity of the vehicle is displaced in a front-rear direction.

FIG. 6 illustrates an example of motion request correction when the vehicle 1 is traveling while turning to the right. When the position of the center of gravity G is displaced forward with respect to the center C, the motion manager 200 (correction unit 212) corrects the motion request such that the driving forces of the left wheels 2 (2*a*, 2*b*) are increased and the braking forces are decreased compared to when the center of gravity G is located at the center C (refer to "Normal condition" in FIG. 6). Further, the motion manager 200 (correction unit 212) corrects the motion request such that the driving forces of the right wheels 2 (2*a*, 2*b*) are decreased and the braking forces are increased compared to when the center of gravity G is located at the center C. In this case, the motion manager 200 (correction unit 212) corrects the motion requests to the power train system 302 and the brake system 304. Only one of the braking force and driving force of the wheel 2 may be corrected.

In addition, when the position of the center of gravity G is displaced forward with respect to the center C, the motion manager 200 (correction unit 212) corrects the motion requests such that the front wheels 2*a* turn more to the right and the rear wheels 2*b* turn more to the left than when the center of gravity G is located at the center C. In this case, the motion manager 200 (correction unit 212) corrects the motion request to the steering system 306 (see FIG. 1). Only one of the front wheel 2*a* and the rear wheel 2*b* may be corrected.

As a result, it is possible to reduce the occurrence of understeer (a phenomenon in which the vehicle has a tendency to turn less sharply than intended) due to the moment of inertia caused by the position of the center of gravity G displaced forward with respect to the center C.

In addition, when the position of the center of gravity G is displaced rearward with respect to the center C, the motion manager 200 (correction unit 212) corrects the motion request such that the driving forces of the left wheels 2 (2*a*, 2*b*) are decreased and the braking forces are increased compared to when the center of gravity G is located at the center C. Further, the motion manager 200 (correction unit 212) corrects the motion request such that the driving forces of the right wheels 2 (2*a*, 2*b*) are increased and the braking forces are decreased compared to when the center of gravity G is located at the center C. In this case, the motion manager 200 (correction unit 212) corrects the motion requests to the power train system 302 and the brake system 304. Only one of the braking force and driving force of the wheel 2 may be corrected.

In addition, when the position of the center of gravity G is displaced rearward with respect to the center C, the motion manager 200 (correction unit 212) corrects the motion request such that the front wheels 2*a* turn more to the left and the rear wheels 2*b* turn more to the right than when the center of gravity G is located at the center C. In this case, the motion manager 200 (correction unit 212) corrects the motion request to the steering system 306. Only one of the front wheel 2*a* and the rear wheel 2*b* may be corrected.

As a result, it is possible to reduce the occurrence of oversteer (a phenomenon in which the vehicle has a tendency to turn more sharply than intended) due to the moment of inertia caused by the position of the center of gravity G displaced forward with respect to the center C.

When the vehicle 1 turns to the left and travels, only the control opposite to the above is performed, so a detailed description will not be repeated.

Figure 7:
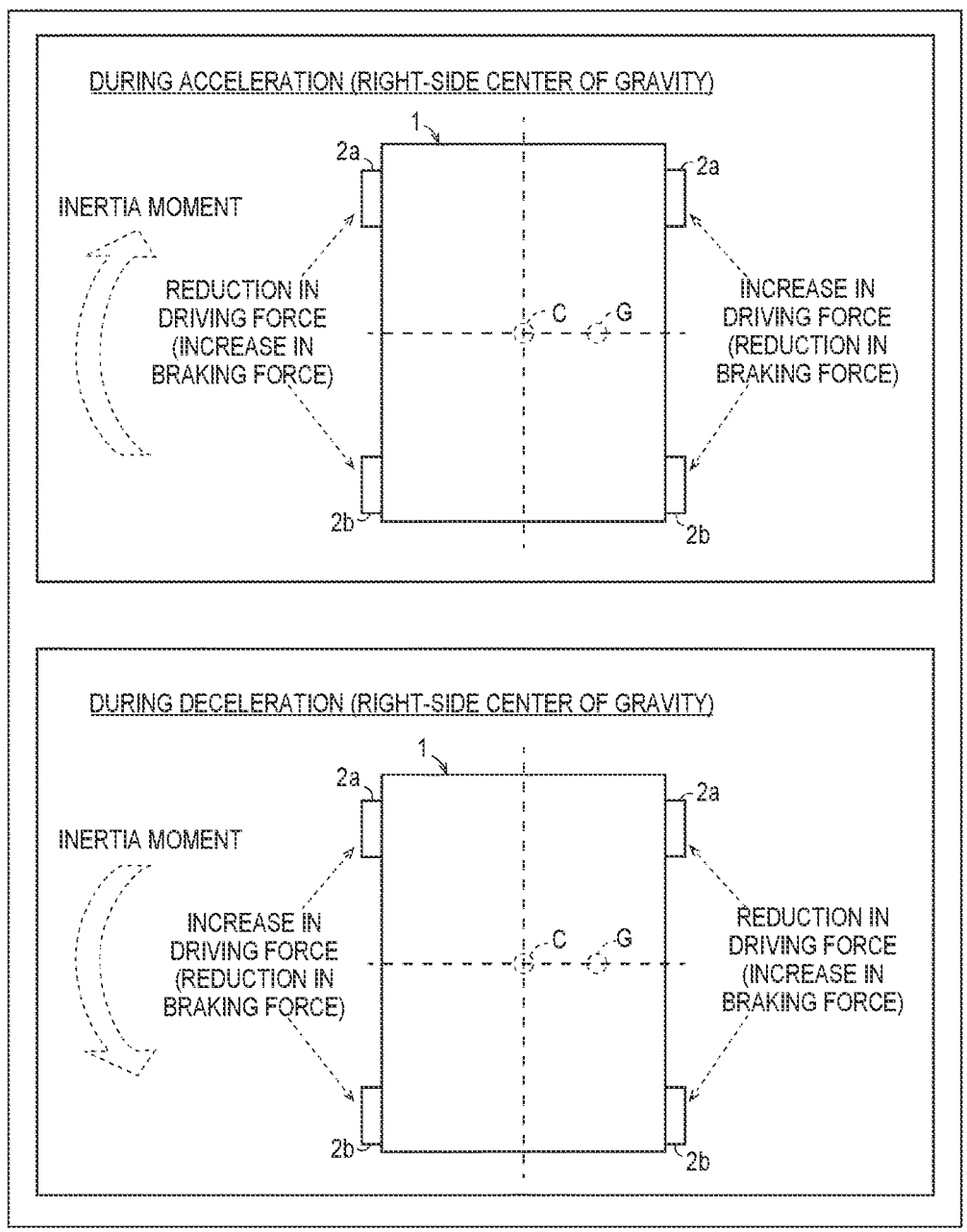
FIG. 7 depicts diagrams illustrating wheel control when the center of gravity of the vehicle is displaced in a right-left direction. Upper diagram is a diagram illustrating control during acceleration. Lower diagram is a diagram illustrating control during deceleration.

In addition, as illustrated in the upper figure in FIG. 7, when the vehicle 1 is traveling while accelerating and the position of the center of gravity G is displaced to the right with respect to the center C, the moment of inertia in a clockwise direction is generated. In this case, the motion manager 200 (correction unit 212) corrects the motion request such that the driving forces of the right wheels 2 (2a, 2b) are increased and the braking forces are decreased. In addition, the motion manager 200 (correction unit 212) corrects the motion request such that the driving forces of the left wheels 2 (2a, 2b) are decreased and the braking forces are increased. In this case, the motion manager 200 (correction unit 212) corrects the motion requests to the power train system 302 and the brake system 304.

These reduce (cancel) the moment of inertia. Only one of the driving force and braking force of the wheel 2 may be corrected. When the center of gravity G is displaced to the left, only the control opposite to the above is performed, so a detailed description will not be repeated.

Further, as illustrated in the lower figure in FIG. 7, when the vehicle 1 is traveling while decelerating and the position of the center of gravity G is displaced to the right with respect to the center C, the moment of inertia in a counterclockwise direction is generated. In this case, the motion manager 200 (correction unit 212) corrects the motion request such that the driving forces of the right wheels 2 (2a, 2b) are decreased and the braking forces are increased. In addition, the motion manager 200 (correction unit 212) corrects the motion request such that the driving forces of the left wheels 2 (2a, 2b) are increased and the braking forces are decreased. In this case, the motion manager 200 (correction unit 212) corrects the motion requests to the power train system 302 and the brake system 304.

These reduce (cancel) the moment of inertia. Only one of the driving force and braking force of the wheel 2 may be corrected. When the center of gravity G is displaced to the left, only the control opposite to the above is performed, so a detailed description will not be repeated.

In addition, the moment of inertia also changes when the total weight of the vehicle 1 changes. Therefore, in the control illustrated in FIGS. 6 and 7, the motion manager 200 (correction unit 212) corrects the motion request such that the moment of inertia is reduced (cancelled) based on the amount of displacement of the center of gravity G of the vehicle 1 with respect to the center C and the amount of change in the total weight of the vehicle 1. The moment of inertia may be calculated by the motion manager 200.

The motion manager 200 (prediction unit 210) may determine whether the total weight of the vehicle 1 has changed from a normal total weight (when the total weight is as expected). The motion manager 200 (correction unit 212) may correct motion requests when it is determined that the total weight of the vehicle 1 has changed from the normal total weight.

Further, in the first embodiment, the motion manager 200 (prediction unit 210) predicts the arrangement of the piece of cargo 20 in the cargo compartment 10a based on the communication state between the communication device 21 (see FIG. 2) of the piece of cargo 20 and the communication device 11 (see FIG. 2) of the vehicle 1. Then, the motion manager 200 (prediction unit 210) predicts the total weight of the vehicle 1 and the position of the center of gravity G of the vehicle 1 based on the predicted arrangement of the piece of cargo 20.

Specifically, the motion manager 200 (prediction unit 210) predicts the arrangement of the piece of cargo 20 based on the information (for example, the position information of the communication device 21 with respect to the communication device 11) from the communication device 21 of the piece of cargo 20 communicating with the communication device 11 of the vehicle 1.

In addition, the motion manager 200 (prediction unit 210) acquires the position information of one (the one near the communication device 11) of the communication devices 21 communicating with each other with respect to the other (the one farther from the communication device 11) based on the communication between the communication devices 21 communicating with each other. As a result, the communication device 11 acquires the position information of the other communication device 21 from one of the communication devices 21 communicating with each other without directly communicating with the other of the communication devices 21 communicating with each other.

Further, the motion manager 200 (prediction unit 210) predicts the total weight of the vehicle 1 and the position of the center of gravity G of the vehicle 1 based on the predicted arrangement of the piece of cargo 20 and the information indicating the weight of the piece of cargo 20 acquired by the communication device 12 of the vehicle 1. Here, each of the communication device 11 and the communication device 12 of the vehicle 1 acquires the ID information of the communication device 22 attached to each piece of cargo as described above. Therefore, the motion manager 200 can link the arrangement information of the piece of cargo 20 acquired by the communication device 11 and the weight information of the piece of cargo 20 acquired by the communication device 12 based on the ID information.

In addition, in the first embodiment, the motion manager 200 (prediction unit 210) predicts the total weight of the vehicle 1 and the position of the center of gravity G of the vehicle 1 based on the weight detected by the seat weight sensor 14. Specifically, the motion manager 200 (prediction unit 210) predicts the total weight of the vehicle 1 and the position of the center of gravity G of the vehicle 1 based on the information corresponding to each of the driver's seat 13a, the passenger's seat 13b, and the rear seat 13c.

Therefore, the motion manager 200 (prediction unit 210) predicts the total weight of the vehicle 1 and the position of the center of gravity G of the vehicle 1 based on the arrangement and weight of the piece of cargo 20 accommodated in the cargo compartment 10a and the weight detected by the seat weight sensor 14.

Figure 8:
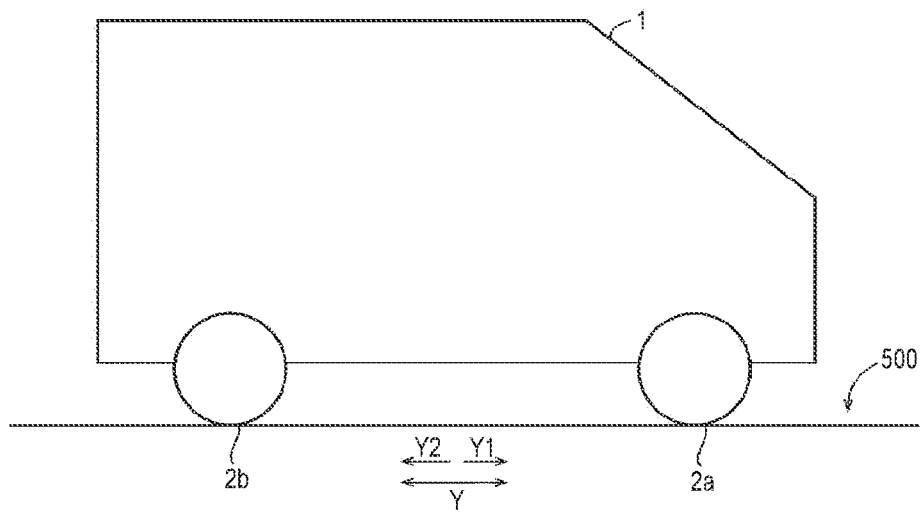
FIG. 8 illustrates a point at which motion demand correction is made.

In addition, in the first embodiment, the motion manager 200 (prediction unit 210) predicts the total weight of the vehicle 1 and the position of the center of gravity G of the vehicle 1 while the vehicle 1 is traveling at a point 500 (see FIG. 8) where the influence on the traveling of the vehicle 1 is reduced. Here, the point 500 where the influence on the traveling of the vehicle 1 is reduced means a flat point (traveling road) where unevenness and inclination are not provided, as illustrated in FIG. 8.

Figure 9:
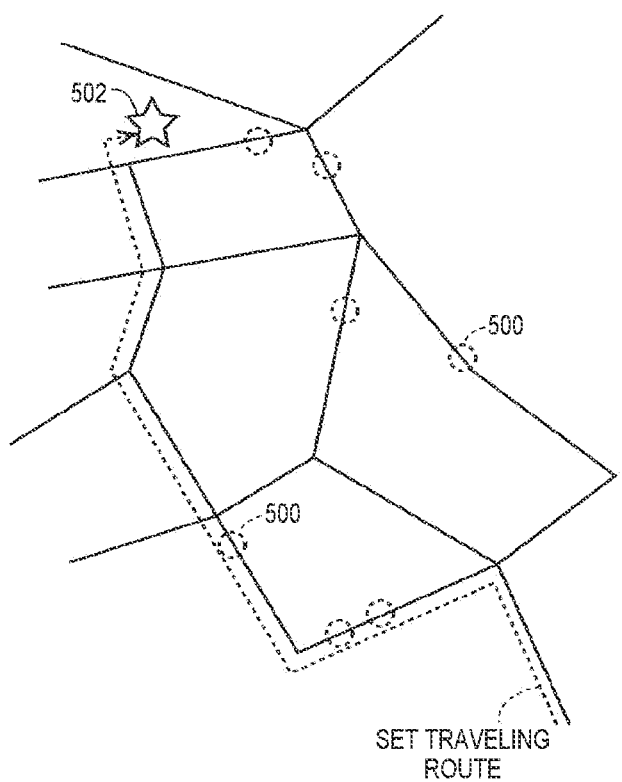
FIG. 9 is a diagram illustrating a travel route of a vehicle.

Here, the route setting unit 214 (see FIG. 1) sets a travel route (see the broken line in FIG. 9) to a destination 502. In the first embodiment, the route setting unit 214 sets the travel route such that the point 500 is included in the travel route. For example, the route setting unit 214 may set a travel route including the point 500 that has the shortest distance to the destination 502. The route setting unit 214 may also set the travel route based on the number of points 500 on the travel route. The travel route set by the route setting unit 214 may be configured to be displayed by a car navigation system or the like (not illustrated).

Description of Motion Request Correction Method

Figure 10:
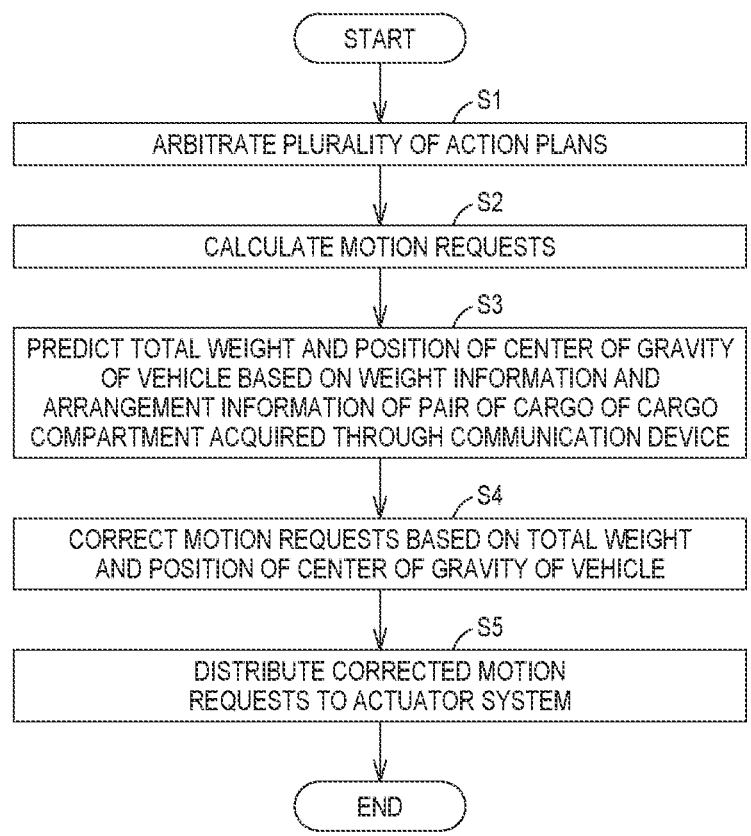
FIG. 10 is a flow chart illustrating a motion request correction method in the vehicle according to the first embodiment.

Next, referring to FIG. 10, a description of the motion request correction method by the motion manager 200 is provided.

First, in step S1, the motion manager 200 (arbitration unit 204) arbitrates a plurality of action plans set by the driving support system 100.

Next, in step S2, the motion manager 200 (calculation unit 206) calculates motion requests to be distributed to the actuator system 300 of the vehicle 1 based on the results of the arbitrations in step S1.

Next, in step S3, the motion manager 200 (prediction unit 210) predicts the total weight of the vehicle 1 and the position of the center of gravity G of the vehicle 1. Specifically, the motion manager 200 (prediction unit 210) acquires the weight information of the piece of cargo 20 (see FIG. 2) and the arrangement information of the piece of cargo based on the communication between the communication device 11 of the vehicle 1 and the communication device 21 of the piece of cargo 20, and the communication between the communication device 12 of the vehicle 1 and the communication device 22 of the cargo 20. Then, the motion manager 200 (prediction unit 210) predicts the total weight of the vehicle 1 and the position of the center of gravity G of the vehicle 1 based on the acquired weight information of the cargo 20 and the arrangement information of the piece of cargo 20. Specifically, the motion manager 200 (prediction unit 210) predicts the total weight of the vehicle 1 and the position of the center of gravity G of the vehicle 1 based on the weight information of the piece of cargo 20, the arrangement information of the piece of cargo 20, and the weight information (and arrangement information) of the occupant (cargo) detected by the seat weight sensor 14.

The control in step S3 may be performed before step S1 or S2, for example.

Next, in step S4, the motion manager 200 (correction unit 212) corrects the motion request based on the total weight of the vehicle 1 and the position of the center of gravity G of vehicle 1 predicted in step S3. Specifically, the motion manager 200 (correction unit 212) performs correction to reduce the moment of inertia caused by the change in the total weight of the vehicle 1 and the displacement of the center of gravity G of the vehicle 1. In detail, the motion manager 200 (correction unit 212) corrects the motion request such that the braking force, driving force, angle, or the like of the wheel 2 are adjusted.

Then, in step S5, the motion manager 200 (distribution unit 208) distributes the motion requests corrected in step S4 to the actuator system 300 (power train system 302, brake system 304, and steering system 306) of the vehicle 1.

As described above, according to the vehicle 1 related to the first embodiment, the motion manager 200 predicts the total weight of the vehicle 1 and the position of the center of gravity G of the vehicle 1 and corrects the motion request based on the predicted total weight and the position of the center of gravity G. Therefore, the motion manager 200 can correct the motion request taking into account the variation in the total weight of the vehicle 1 and the position of the center of gravity G of the vehicle 1. As a result, it is possible to reduce the traveling state of the vehicle from becoming abnormal due to variations in the total weight of the vehicle 1 and the position of the center of gravity G of the vehicle 1.

In addition, the motion manager 200 predicts the arrangement of the piece of cargo 20 in the cargo compartment 10a based on the communication state between the communication device 11 of the vehicle 1 and the communication device 21 of the piece of cargo 20, and predicts the total weight of the vehicle 1 and the center of gravity G of the vehicle 1 based on the predicted arrangement of the piece of cargo 20. Here, the communication device 11 is a relatively small device. Therefore, it is possible to reduce the vehicle 1 from increasing in size due to the provision of the communication device 11 in the vehicle 1.

Second Embodiment

Next, a second embodiment of the present disclosure will be described with reference to FIGS. 11 and 12. In the second embodiment, unlike the first embodiment in which the total weight of the vehicle 1 and the center of gravity G of the vehicle 1 are predicted based on information from the communication devices (11, 12, 21, 22), the total weight of the vehicle 1 and the center of gravity G of the vehicle 1 are predicted using a camera 10b provided in the cargo compartment 10a. The same reference numerals are assigned to the same configurations as in the first embodiment, and the same descriptions will not be repeated.

Vehicle Configuration

Figure 11:
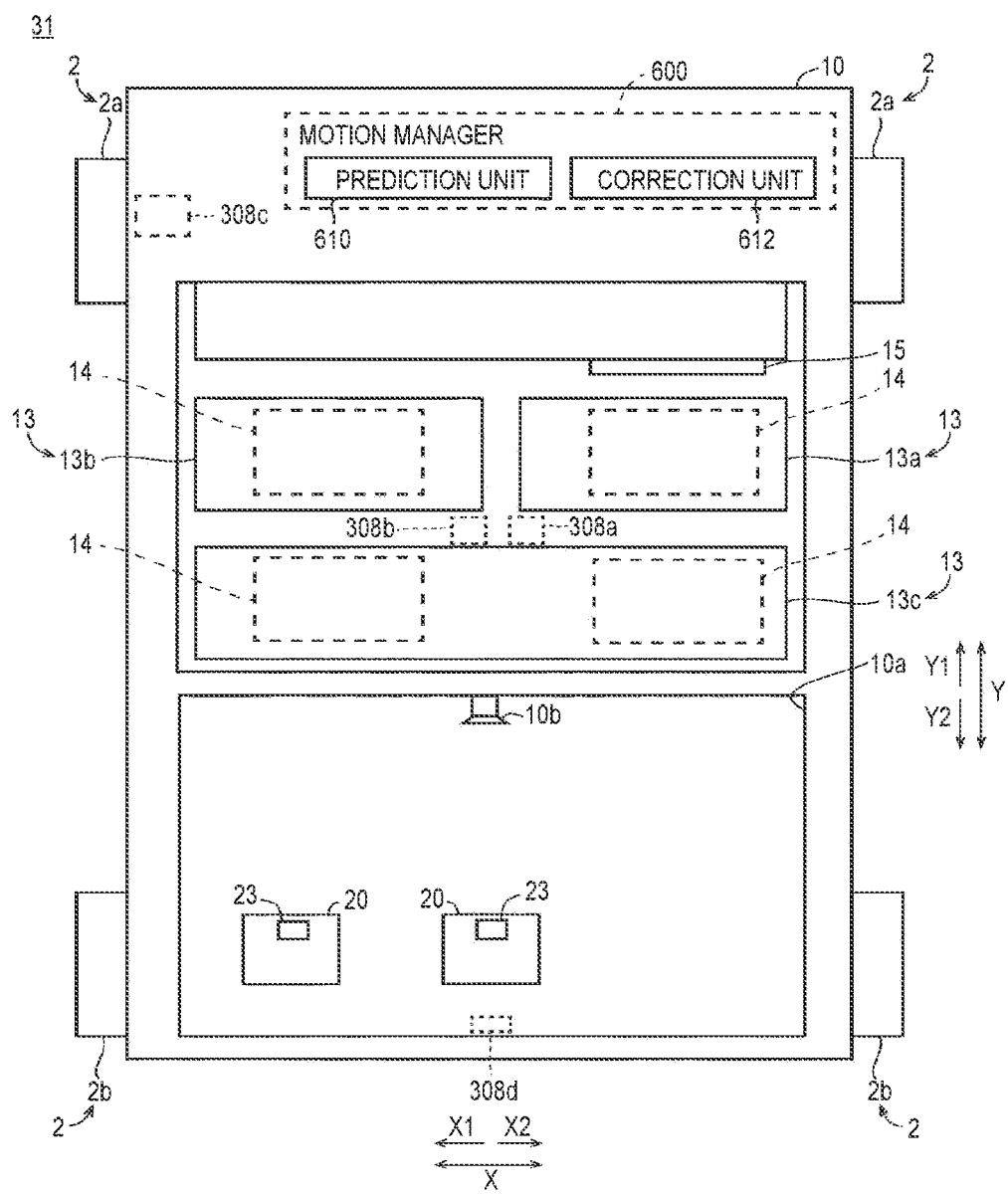
FIG. 11 is a diagram illustrating a configuration of a vehicle (vehicle body) according to a second embodiment.

FIG. 11 is a diagram illustrating an example of the configuration of a vehicle 31. The vehicle 31 has a motion manager 600. The motion manager 600 includes a prediction unit 610 and a correction unit 612.

The vehicle 31 has a camera 10b provided in the cargo compartment 10a. The camera 10b is provided so as to capture an image of the cargo compartment 10a from the front side (Y1 side) of the cargo compartment 10a. Images captured by the camera 10b are transmitted to the motion manager 600. FIG. 11 illustrates an example in which only one camera 10b is provided, but a plurality of cameras 10b may be provided in the cargo compartment 10a.

The camera 10b is configured to be able to read the position information of the piece of cargo 20 accommodated in the cargo compartment 10a. The motion manager 600 acquires position information (coordinate information in the cargo compartment 10a) of the piece of cargo 20 based on the image captured by the camera 10b. The camera 10b itself may acquire the position information (coordinate information in the cargo compartment 10a) of the piece of cargo 20 and transmit the acquired position information (coordinate information) of the piece of cargo 20 to the motion manager 600.

A code indicating the weight information of the piece of cargo 20 is attached to the piece of cargo 20 accommodated in the cargo compartment 10a. Specifically, the piece of cargo 20 is attached with a seal 23 on which the code is written. The camera 10b can read the code.

Here, in the second embodiment, the motion manager 600 (prediction unit 610) predicts the total weight of the vehicle 31 and the position of the center of gravity G of the vehicle 31 based on the position information of the piece of cargo 20 acquired by the camera 10b and the weight information of the piece of cargo 20 acquired by the camera 10b from the code described in the seal 23. That is, the motion manager 600 (prediction unit 610) predicts the position (and total weight of vehicle 31) of the center of gravity G of the vehicle 31 by associating the position information (coordinate information) on which the piece of cargo 20 is placed in the cargo compartment 10a and the weight information of the piece of cargo 20 with each other.

Description of Motion Request Correction Method

Figure 12:
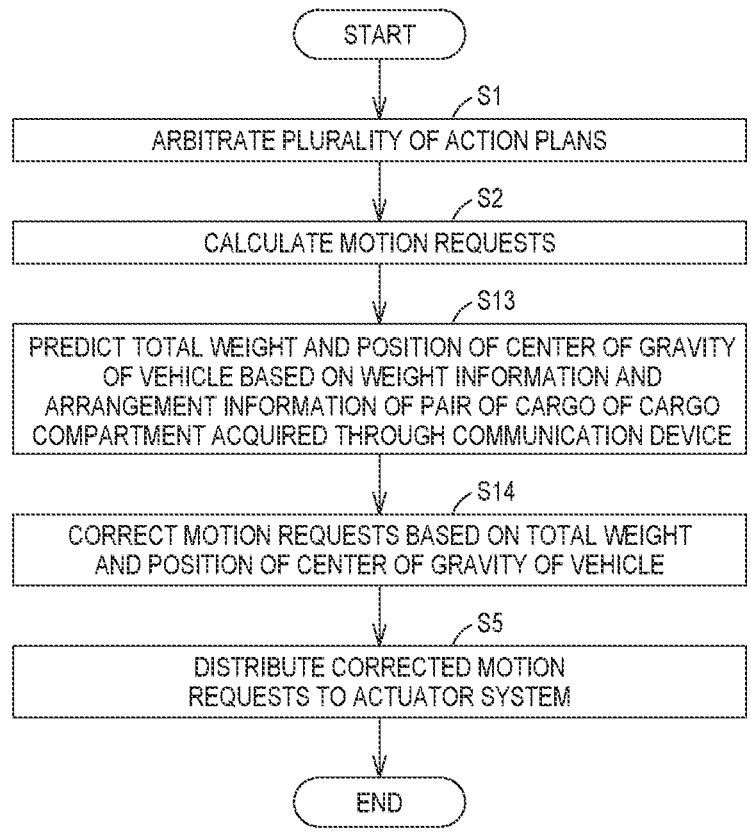
FIG. 12 is a flow chart illustrating a motion request correction method in the vehicle according to the second embodiment.

Next, referring to FIG. 12, the description of the motion request correction method by the motion manager 600 is provided. In the second embodiment, steps S3 and S4 of the first embodiment are respectively replaced with steps S13 and S14 described below, and other steps are the same as those of the first embodiment.

In step S13, the motion manager 600 (prediction unit 610) predicts the total weight of the vehicle 31 and the position of the center of gravity G of the vehicle 31. Specifically, the motion manager 600 (prediction unit 610) predicts the total weight of the vehicle 31 and the position of the center of gravity G of the vehicle 31 based on the weight information of the piece of cargo 20 and the arrangement information of the piece of cargo acquired using the camera 10b (see FIG. 11). Specifically, the motion manager 600 (prediction unit 610) predicts the total weight of the vehicle 31 and the position of the center of gravity G of the vehicle 31 based on the weight information of the piece of cargo 20, the arrangement information of the piece of cargo 20, and the weight information (and arrangement information) of the occupant (cargo) detected by the seat weight sensor 14.

The prediction step in step S13 may be performed, for example, before step S1 or S2.

Next, in step S14, the motion manager 600 (correction unit 612) corrects the motion request based on the total weight of the vehicle 31 and the position of the center of gravity G of the vehicle 31 predicted in step S13.

As described above, according to the vehicle 31 related to the second embodiment, the motion manager 600 predicts the total weight of the vehicle 31 and the center of gravity G of the vehicle 31 based on the position information of the piece of cargo acquired by the camera 10b and the weight information of the piece of cargo 20 acquired by the camera 10b from the code. Accordingly, it is possible to easily acquire accurate position information of the piece of cargo 20 based on the actual image of the cargo compartment 10a acquired by the camera 10b.

Other configurations and effects of the second embodiment are the same as those of the first embodiment.

Third Embodiment

Next, a third embodiment of the present disclosure will be described with reference to FIGS. 13 and 14. In the third embodiment, unlike the first embodiment in which the total weight of the vehicle 1 and the center of gravity G of the vehicle 1 are predicted based on information from the communication devices (11, 12, 21, 22), the total weight of the vehicle 1 and the center of gravity G of the vehicle 1 are predicted using a cargo weight sensor 10c provided in the cargo compartment 10a. The same reference numerals are assigned to the same configurations as in the first embodiment, and the same descriptions will not be repeated.

Vehicle Configuration

Figure 13:
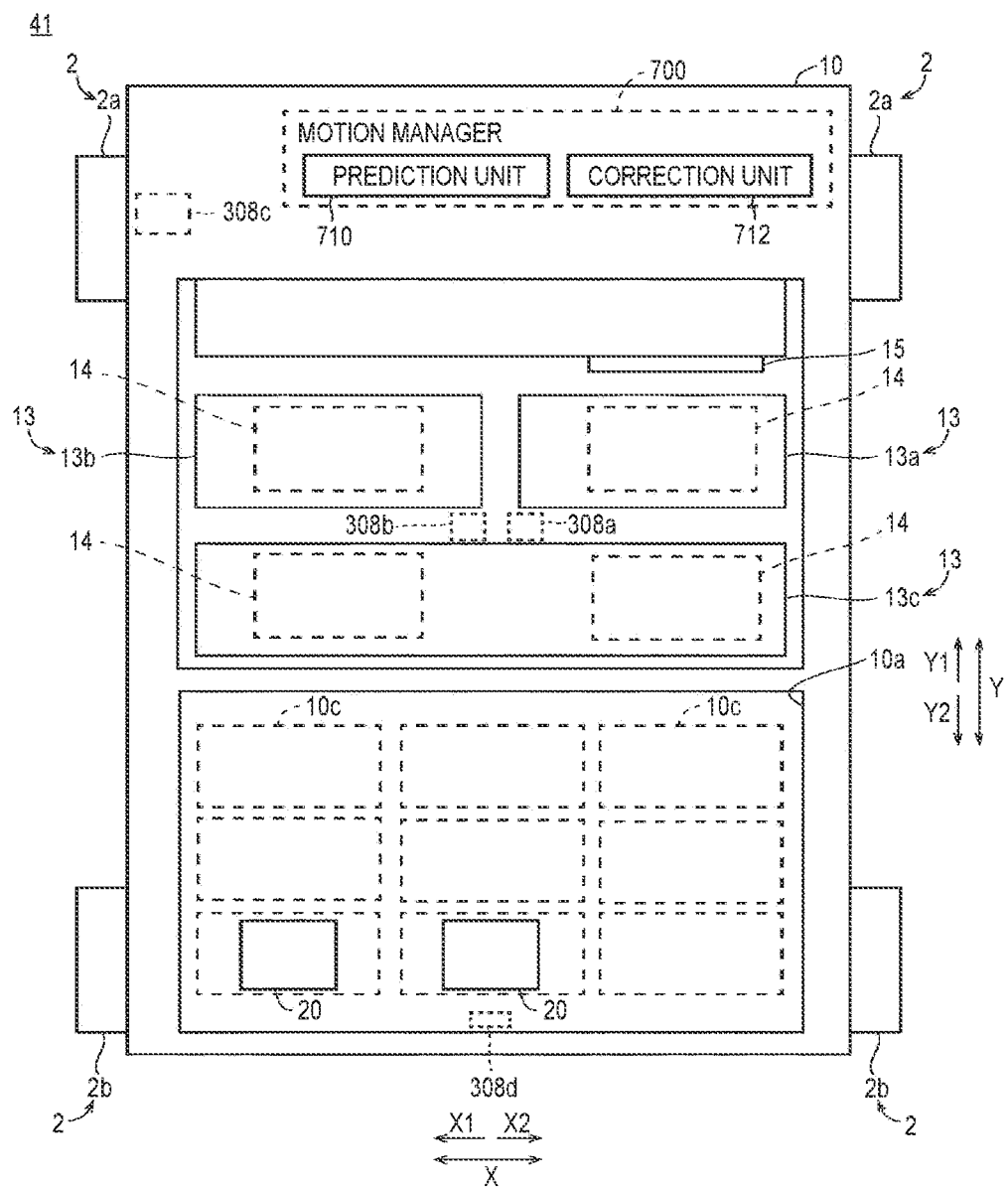
FIG. 13 is a diagram illustrating a configuration of a vehicle (vehicle body) according to a third embodiment.

FIG. 13 is a diagram illustrating an example of the configuration of a vehicle 41. The vehicle 41 includes a motion manager 700. The motion manager 700 includes a prediction unit 710 and a correction unit 712.

The vehicle 41 includes the cargo weight sensor 10c provided in the cargo compartment 10a. The cargo weight sensor 10c is provided such that the piece of cargo 20 is placed on the bottom surface of the cargo compartment 10a. The cargo weight sensor 10c detects the weight of the piece of cargo 20 accommodated in the cargo compartment 10a. The weight information of the piece of cargo 20 detected by the cargo weight sensor 10c is transmitted to the motion manager 700. The cargo weight sensor 10c is an example of the "first weight sensor" of the present disclosure.

A plurality of cargo weight sensors 10c are provided in the cargo compartment 10a. The cargo weight sensors 10c are arranged, for example, in a matrix when viewed from above. The motion manager 700 acquires the position information of the piece of cargo 20 based on the position of the cargo weight sensor 10c that acquires the weight information of the piece of cargo 20. Thereby, the motion manager 700 acquires the weight information of the piece of cargo 20 and the position information (coordinate information in the cargo compartment 10a) of the piece of cargo 20. The number of cargo weight sensors 10c is not limited to the above. For example, the number of cargo weight sensors 10c may be one.

Here, in the third embodiment, the motion manager 700 (prediction unit 710) predicts the total weight of the vehicle 41 and the position of the center of gravity G of the vehicle 41 based on the weight information of the piece of cargo 20 detected by the cargo weight sensor 10c. Specifically, the motion manager 700 (prediction unit 710) predicts the total weight of the vehicle 41 and the position of the center of gravity G of the vehicle 41 based on the weight information of the piece of cargo 20 detected by the cargo weight sensor 10c and the position information (coordinate information in the cargo compartment 10a) of the piece of cargo 20.

Description of Motion Request Correction Method

Figure 14:
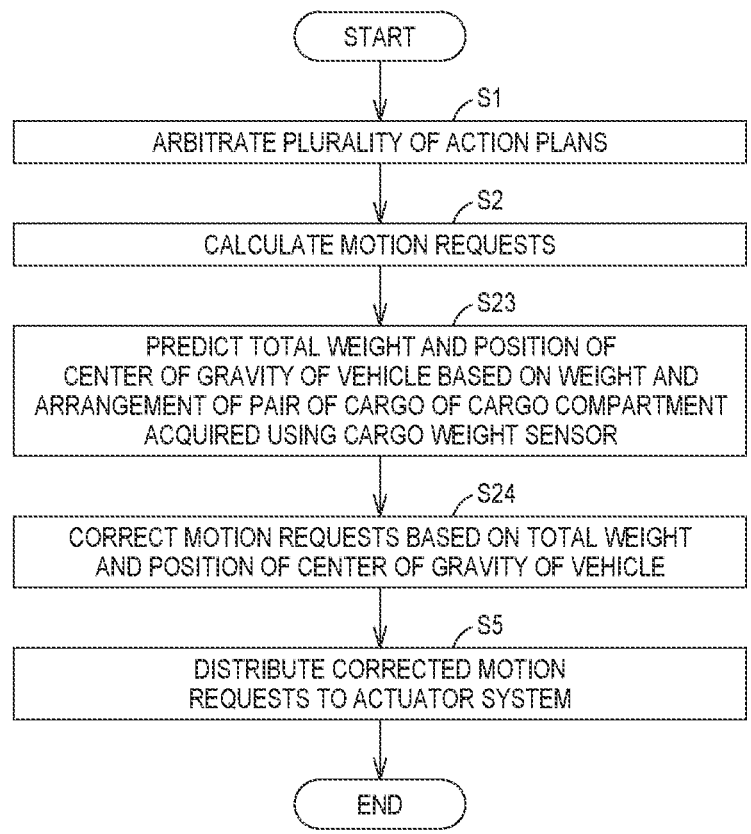
FIG. 14 is a flow chart illustrating a motion request correction method in the vehicle according to the third embodiment.

Next, referring to FIG. 14, the description of a motion request correction method by the motion manager 700 is provided. In the third embodiment, steps S3 and S4 of the first embodiment are respectively replaced with steps S23 and S24 described below, and other steps are the same as in the first embodiment.

In step S23, the motion manager 700 (prediction unit 710) predicts the total weight of the vehicle 41 and the position of the center of gravity G of the vehicle 41. Specifically, the motion manager 700 (prediction unit 710) predicts the total weight of the vehicle 41 and the position of the center of gravity G of the vehicle 41 based on the weight information of the piece of cargo 20 and the arrangement information of the piece of cargo acquired using the cargo weight sensor 10c (see FIG. 13), In detail, the motion manager 700 (prediction unit 710) predicts the total weight of the vehicle 41 and the position of the center of gravity G of the vehicle 41 based on the weight information of the piece of cargo 20, the arrangement information of the piece of cargo 20, and the weight information (and arrangement information) of the occupant (cargo) detected by the seat weight sensor 14, The prediction step in step S23 may be performed, for example, before step S1 or S2.

Next, in step S24, the motion manager 700 (correction unit 712) corrects the motion request based on the total weight of the vehicle 41 and the position of the center of gravity G of the vehicle 41 predicted in step S23.

As described above, according to the vehicle 41 related to the third embodiment, the motion manager 700 predicts the total weight of the vehicle 41 and the position of the center of gravity G of the vehicle 41 based on the weight of the piece of cargo detected by the cargo weight sensor 10c. Thereby, the motion manager 700 can acquire accurate weight information of the piece of cargo 20 from the cargo weight sensor 10c. As a result, the motion manager 700 can accurately predict the total weight of the vehicle 41 and the position of the center of gravity G of the vehicle 41.

Other configurations in the third embodiment are the same as those in the first embodiment.

Fourth Embodiment

Next, a fourth embodiment of the present disclosure will be described with reference to FIGS. 15 to 17. In the fourth embodiment, unlike the first embodiment in which the total weight of the vehicle 1 and the center of gravity G of the vehicle 1 are predicted based on information from the communication devices (11, 12, 21, 22), the total weight of the vehicle 1 and the center of gravity G of the vehicle 1 are predicted based on the angular acceleration of the vehicle 51. The same reference numerals are assigned to the same configurations as in the first embodiment, and the same description will not be repeated.

Vehicle Configuration

Figure 15:
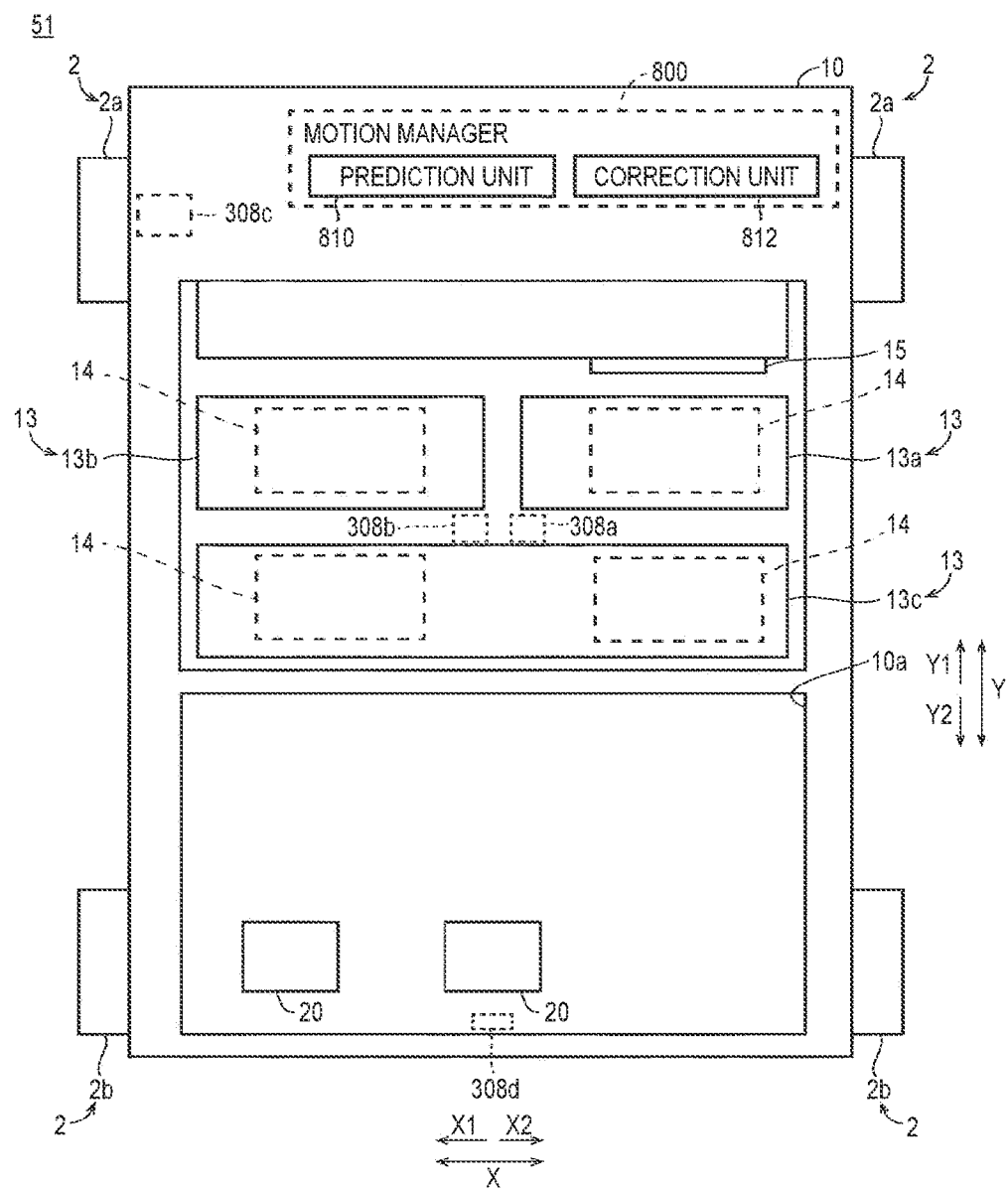
FIG. 15 is a diagram illustrating a configuration of a vehicle (vehicle body) according to a fourth embodiment.

FIG. 15 is a diagram illustrating an example of the configuration of a vehicle 51. The vehicle 51 includes a motion manager 800. The motion manager 800 includes a prediction unit 810 and a correction unit 812.

In the fourth embodiment, the motion manager 800 (prediction unit 810) predicts the position of the center of gravity G of the vehicle 51 based on the angular acceleration of the vehicle 51 detected by a yaw rate sensor 308d. Therefore, the motion manager 800 (correction unit 812) corrects the motion request based on the angular acceleration of the vehicle 51 detected by the yaw rate sensor 308d. A method of predicting the position of the center of gravity G of the vehicle 51 based on the angular acceleration of the vehicle 51 will be described below.

Figure 16:
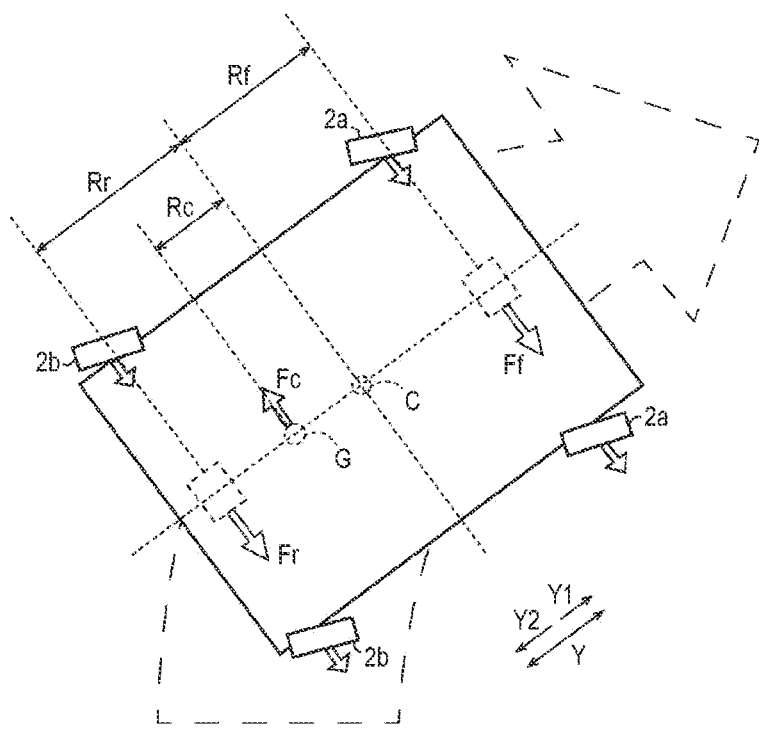
FIG. 16 is a diagram for illustrating correction of a motion request in a vehicle of which center of gravity is displaced in the front-rear direction according to the fourth embodiment.

FIG. 16 is a diagram in which the center of gravity G of the vehicle 51 is displaced rearward (Y2 side) from the center C of the vehicle 51 by a predetermined distance (assumed to be Rc). Here, When the vehicle 51 of which the center of gravity G is displaced from the center C travels under traveling conditions (speed, steering angle, driving force, and the like) where the vehicle 51 turns in a stationary circle when the center of gravity G of the vehicle 51 is located at the center C of the vehicle 51, angular acceleration occurs in a yaw direction of the vehicle 51. The traveling conditions necessary for the vehicle 51 to make a steady circular turn are measured in advance at the time of design or vehicle evaluation, and are stored in a storage device (not illustrated) of the vehicle 51 or the like.

Here, the angular acceleration of the vehicle 51 in the yaw direction is set to a. Further, the moment of inertia of the vehicle 51 in the yaw direction is set to I. The total weight of the vehicle 51 is set to M. The speed of the vehicle 51 is set to v. The turning radius of the vehicle 51 is set to Rt. In addition, the torque due to the total lateral force (Ff in FIG. 16) of the front wheels 2a is set to Tf. The torque due to the total lateral force (Fr in FIG. 16) of the rear wheels 2b is set to Tr. The torque due to the centrifugal force (Fc in FIG. 16) is set to Tc. In addition, the distance in the Y direction between the center between the front wheels 2a and the center C of the vehicle 51 is set to Rf. The distance in the Y direction between the center between the rear wheels 2b and the center C of the vehicle 51 is set to Rr.

The relationship between the moment of inertia of the vehicle 51 in the yaw direction and the total weight of the vehicle 51 is expressed by the following equation (1).

$$I = M \times Rc^2 \quad (1)$$

In addition, the torque (assumed to be t) of the vehicle 51 in the yaw direction is expressed by the following equations (2) and (3).

$$t = Tf + Tr + Tc \quad (2)$$

$$t = I \times \alpha \quad (3)$$

Each torque (Tf, Tr, Tc) is the product of the lateral force (centrifugal force) applied to the wheel 2 and the distance to the center C, so the following equation (4) holds true.

$$Tf + Tr + = Ff \times Rf + Fr \times Rr \times Rc \quad (4)$$

Therefore, the relationship between the moment of inertia of the vehicle 51 in the yaw direction and the torque of the vehicle 51 in the yaw direction is expressed by the following equation (5).

$$Ff \times Rf + Fr \times Rr + Fc \times Rc = I \times \alpha \quad (5)$$

Based on the above equations (1) and (5), the following equation (6) holds true, which expresses the relationship between the distance (Rc) between the center of gravity G and the center C and the angular acceleration ($\alpha$).

$$Rc = \frac{M \times Rc^2 \times \alpha - Ff \times Rf - Fr \times Rr}{Fc} \quad (6)$$

Further, the following equation (7) holds true, which expresses the relationship between the centrifugal force (Fc) applied to the vehicle 51, the weight (M) of the vehicle 51, the speed (v), and the turning radius (Rt).

$$Fc = \frac{M \times v^2}{Rt} \quad (7)$$

Here, under traveling conditions where the vehicle turns in a stationary circle under the normal condition where the center of gravity G is located at the center C, the torque (Tf) due to the front wheels 2a and the torque (Tr) due to the rear wheels 2b cancel each other out. Accordingly, the following equation (8) holds true based on the above equations (6) and (7).

$$Rc = \frac{M \times Rc^2 \times \alpha \times Rt}{M \times v^2} \quad (8)$$

Based on the above equation (8), the following equation (9), which expresses the relationship between the distance (Rc) between the center of gravity G and the center C and the angular acceleration ($\alpha$), holds true.

$$Rc = \frac{v^2}{Rt \times \alpha} \quad (9)$$

That is, the distance (Rc) between the center of gravity G of the vehicle 51 and the center C of the vehicle 51 is a value based on the velocity (v) of the vehicle 51 and the angular acceleration ($\alpha$) of the vehicle 51 in the yaw direction. Therefore, the motion manager 800 (prediction unit 810) predicts the position of the center of gravity G of the vehicle 51 based on the angular acceleration of the vehicle 51 detected by the yaw rate sensor 308d and the velocity of the vehicle 51 detected by a velocity sensor (not illustrated).

Figure 17:
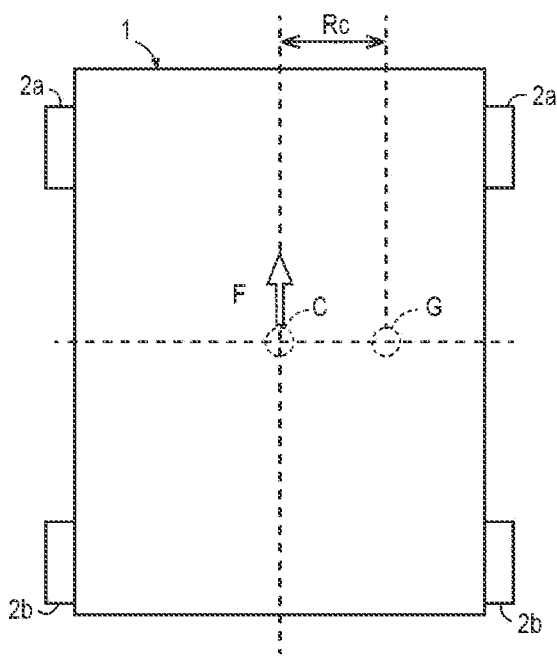
FIG. 17 is a diagram for illustrating correction of a motion request in a vehicle of which center of gravity is displaced in the right-left direction according to the fourth embodiment.

Next, FIG. 17 is a diagram illustrating a case where the center of gravity G of the vehicle 51 is displaced to the right from the center C of the vehicle 51 by a predetermined distance (Rc). The acceleration of the vehicle 51 in the front-rear direction is set to Ax. Further, the force (the sum of the braking force and the driving force) in the front-rear direction of the vehicle 51 is set to F.

The relationship between the moment of inertia of the vehicle 51 in the yaw direction and the total weight of the vehicle 51 is represented by the following equation (10).

$$I = M \times Rc^2 \tag{10}$$

The relationship between the moment (torque) of the vehicle 51 in the yaw direction and the force of the vehicle 51 in the front-rear direction is expressed by the following equation (11).

$$t = Rc \times F \tag{11}$$

The relationship between the moment (torque) of the vehicle 51 in the yaw direction and the moment of inertia of the vehicle 51 in the yaw direction is expressed by the following equation (12).

$$t = I \times \alpha \tag{12}$$

Then, based on the above equations (10) to (12), the following equation (13), which expresses the relationship between the angular acceleration and the distance (Rc) between the center of gravity G and the center C, holds true.

$$Rc = \frac{F}{M \times \alpha} \tag{13}$$

That is, the distance (Rc) between the center of gravity G of the vehicle 51 and the center C of the vehicle 51 is a value based on the angular acceleration ($\alpha$) of the vehicle 51 in the yaw direction. Further, the force (F) of the vehicle 51 in the front-rear direction is represented by the product (F=M×Ax) of the total weight (M) of the vehicle 51 and the acceleration (Ax) of the vehicle 51, so the distance (Rc) is a value based on the angular acceleration ($\alpha$) of the vehicle 51 in the yaw direction and the acceleration (Ax) of the vehicle 51. Therefore, the motion manager 800 (prediction unit 810) predicts the position of the center of gravity G of the vehicle 51 based on the angular acceleration of the vehicle 51 detected by the yaw rate sensor 308*d* and the longitudinal acceleration detected by the longitudinal G sensor 308*a*.

As described above, according to the vehicle 51 according to the fourth embodiment, the motion manager 800 corrects the motion request based on the angular acceleration detected by the yaw rate sensor 308*d*. Here, the yaw rate sensor 308*d* is a sensor commonly provided in vehicles. Therefore, motion requests can be corrected without installing special equipment in the vehicle. Thus, it is possible to reduce the complication of the configuration of the vehicle 51 and reduce the increase in the number of parts of the vehicle 1.

Description of Motion Request Correction Method

Figure 18:
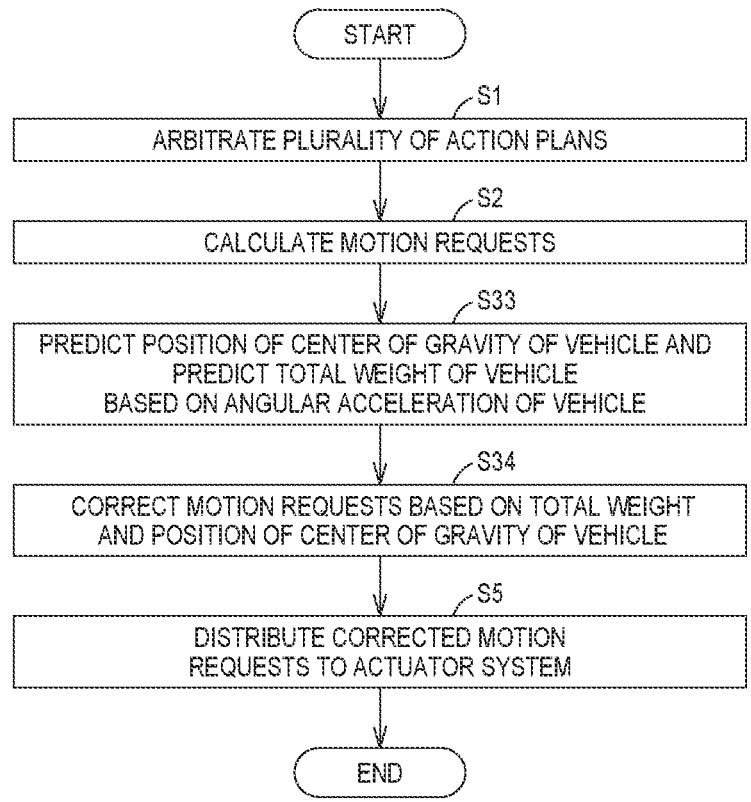
FIG. 18 is a flow chart illustrating a motion request correction method in a vehicle according to the fourth embodiment.

Next, referring to FIG. 18, a description of the motion request correction method by the motion manager 800 is provided. In the fourth embodiment, steps S3 and S4 of the first embodiment are respectively replaced with steps S33 and S34 described below, and other steps are the same as those of the first embodiment.

In step S33, the motion manager 800 (prediction unit 810) predicts the total weight of the vehicle 51 and the position of the center of gravity G of the vehicle 51. Specifically, the motion manager 800 (prediction unit 810) predicts the position of the center of gravity G of the vehicle 51 based on the angular acceleration (see the equations (9) and (13)) of the vehicle 51 detected by the yaw rate sensor 308*d*. The motion manager 800 (prediction unit 810) may predict the total weight of the vehicle 51 using any of the methods of the first to third embodiments.

The prediction step in step S33 may be performed, for example, before step S1 or S2.

Next, in step S34, the motion manager 800 (correction unit 812) corrects the motion request based on the total weight of the vehicle 51 and the position of the center of gravity G of the vehicle 51 predicted in step S33.

Other configurations and effects of the fourth embodiment are the same as those of the first embodiment. The prediction of the total weight of the vehicle 51 may be performed by any of the prediction methods of the first to third embodiments.

Further, in the first to fourth embodiments, although an example in which the total weight of the vehicle 1 (31, 41, 51) and the position of the center of gravity G of the vehicle 1 (31, 41, 51) are predicted is shown, the present disclosure is not limited to this. Only one of the total weight of the vehicle 1 (31, 41, 51) and the position of the center of gravity G of the vehicle 1 (31, 41, 51) may be predicted.

Further, in the first to fourth embodiments, although an example in which the travel route is set such that the travel route includes the point 500 where influence on travel is reduced is shown, the present disclosure is not limited to this. The travel route may not include the point 500 where the influence on travel is reduced.

Further, in the first to fourth embodiments, although an example in which the yaw rate sensor 308*d* directly detects the angular acceleration of the vehicle 1 (31, 41, 51) is shown, the present disclosure is not limited to this. For example, the angular acceleration may be calculated (detects angular acceleration indirectly) from the angular velocity detected by a gyro sensor. In addition, instead of directly detecting the acceleration of the vehicle 1 (31, 41, 51) by the longitudinal G sensor 308*a* (lateral G sensor 308*b*), the acceleration may be calculated (detects acceleration indirectly) based on the vehicle speed detected by a vehicle speed sensor, for example.

Further, in the first embodiment, although an example in which the motion manager 200 acquires the total weight of the vehicle 1 by acquiring the weight information of the piece of cargo 20 by the communication device 22 attached to the piece of cargo 20 is shown, the present disclosure is not limited to this. The motion manager 200 may predict the total weight of the vehicle 1 assuming that the weight of the piece of cargo 20 is a predetermined fixed value (for example, 2 Kg).

It should be considered that the embodiments disclosed this time are illustrative in all respects and not restrictive. The scope of the present disclosure is indicated by the scope of the claims rather than the above description, and is intended to include all modifications within the meaning and scope of equivalents of the scope of the claims.

All or part of the modification examples described above may be combined as appropriate. Further, all or part of the configurations of the above-described first to fourth embodiments may be combined as appropriate.

What is claimed is:

1. A vehicle comprising:
   a driving support system configured to set an action plan for driving support of the vehicle;
   a motion manager including one or more processors configured to arbitrate a plurality of action plans set by the driving support system; and an actuator system to which a motion request generated using a result of arbitration by the motion manager is distributed, wherein the one or more processors of the motion manager are configured to:
  predict at least one of a total weight of the vehicle and a position of a center of gravity of the vehicle; and
  correct the motion request based on the at least one of the predicted total weight and the predicted position of the center of gravity such that an influence of the total weight and the position of the center of gravity on traveling of the vehicle is reduced, the actuator system moves the vehicle according to the corrected motion request, the one or more processors of the motion manager are further configured to:
  set a travel route to a destination such that a traveling point where the influence of the total weight and the position of the center of gravity on traveling of the vehicle is reduced is included in the travel route, and
  predict the at least one of the total weight and the position of the center of gravity when the vehicle is traveling at the traveling point where the influence on the traveling of the vehicle is reduced, the travel route is set based on the number of the traveling points on the travel route such that the vehicle is moved through a plurality of the traveling points located along different road segments along the travel route at which the at least one of the total weight and the position of the center of gravity is predicted, and the one or more processors of the motion manager predict the at least one of the total weight and the position of the center of gravity based only on information received from in-vehicle devices.

2. The vehicle according to claim 1, further comprising:
a vehicle body at which a cargo compartment is formed in which at least one piece of cargo is accommodated; and
a first vehicle-side communication device provided in the cargo compartment, wherein:
the first vehicle-side communication device is configured to communicate with a first cargo-side communication device attached to the piece of cargo; and
the one or more processors of the motion manager are configured to:
  predict an arrangement of the piece of cargo in the cargo compartment based on a communication state between the first cargo-side communication device and the first vehicle-side communication device; and
  predict the at least one of the total weight and the position of the center of gravity based on the predicted arrangement of the piece of cargo.

3. The vehicle according to claim 2, wherein:
the cargo compartment accommodates a plurality of pieces of cargo to each of which the first cargo-side communication device is attached; and
the first vehicle-side communication device is configured to acquire, through the first cargo-side communication device, information indicating that the first cargo-side communication devices of the pieces of cargo that are adjacent to each other communicate with each other.

4. The vehicle according to claim 2, further comprising a second vehicle-side communication device configured to communicate with a second cargo-side communication device attached to the piece of cargo, wherein:
the second vehicle-side communication device is configured to acquire, through the second cargo-side communication device, information indicating a weight of the piece of cargo to which the second cargo-side communication device is attached; and
the one or more processors of the motion manager are configured to predict the at least one of the total weight and the position of the center of gravity based on the predicted arrangement of the piece of cargo and the acquired information indicating the weight of the piece of cargo.

5. The vehicle according to claim 1, further comprising:
a vehicle body at which a cargo compartment is formed in which a piece of cargo is accommodated; and
a camera provided in the cargo compartment, wherein:
the camera is configured to read position information of the piece of cargo and a code attached to the piece of cargo and indicating weight information of the piece of cargo, and
the one or more processors of the motion manager are configured to predict the at least one of the total weight and the position of the center of gravity based on the position information of the piece of cargo acquired by the camera and the weight information acquired by the camera from the code.

6. The vehicle according to claim 1, further comprising:
a vehicle body at which a cargo compartment is formed in which a piece of cargo is accommodated; and
a first weight sensor provided in the cargo compartment, wherein:
the first weight sensor is configured to detect a weight of the piece of cargo accommodated in the cargo compartment, and
the one or more processors of the motion manager are configured to predict the at least one of the total weight and the position of the center of gravity based on the weight of the piece of cargo detected by the first weight sensor.

7. The vehicle according to claim 1, further comprising:
a seat; and
a second weight sensor provided in the seat, wherein
the one or more processors of the motion manager are configured to predict the at least one of the total weight and the position of the center of gravity based on a weight detected by the second weight sensor.

8. The vehicle according to claim 1, wherein the one or more processors of the motion manager are configured to:
determine whether the position of the center of gravity of the vehicle is displaced with respect to a center of the vehicle; and
add, upon determining that the position of the center of gravity is displaced with respect to the center, a correction value for reducing a moment of inertia caused by displacement of the center of gravity to the motion request.

9. The vehicle according to claim 1, wherein the one or more processors of the motion manager are configured to:
determine whether the position of the center of gravity of the vehicle is displaced at least in a front-rear direction with respect to a center of the vehicle; and
correct, upon determining that the position of the center of gravity is displaced in one of a front and a rear with respect to the center, the motion request such that a braking force applied to a wheel of the one of the front and the rear of the vehicle is increased compared to when the center of gravity is located at the center.

10. The vehicle according to claim 1, further comprising an angular acceleration sensor configured to detect angular acceleration of the vehicle, wherein the one or more processors of the motion manager are configured to correct the motion request based on the angular acceleration detected by the angular acceleration sensor.

11. A motion manager comprising:
one or more processors configured to:
  arbitrate a plurality of action plans for driving support of a vehicle set by a driving support system of the vehicle;
  calculate a motion request based on a result of arbitration;
  distribute the motion request to an actuator system of the vehicle;
  predict at least one of a total weight of the vehicle and a position of a center of gravity of the vehicle;
  correct the motion request based on the at least one of the predicted total weight and the predicted position of the center of gravity such that an influence of the total weight and the position of the center of gravity on traveling of the vehicle is reduced; and
  transmit a request signal to the actuator system such that the actuator system moves the vehicle according to the corrected motion request, wherein
the one or more processors are further configured to:
  set a travel route to a destination such that a traveling point where the influence of the total weight and the position of the center of gravity on traveling of the vehicle is reduced is included in the travel route; and
  predict the at least one of the total weight and the position of the center of gravity when the vehicle is traveling at the traveling point where the influence on the traveling of the vehicle is reduced,
the travel route is set based on the number of the traveling points on the travel route such that the vehicle is moved through a plurality of the traveling points located along different road segments along the travel route at which the at least one of the total weight and the position of the center of gravity is predicted, and
the one or more processors predict the at least one of the total weight and the position of the center of gravity based only on information received from in-vehicle devices.

12. A motion request correction method comprising:
arbitrating a plurality of action plans for driving support of a vehicle set by a driving support system of the vehicle;
calculating a motion request to be distributed to an actuator system of the vehicle based on a result of arbitration;
predicting at least one of a total weight of the vehicle and a position of a center of gravity of the vehicle;
correcting the calculated motion request based on the at least one of the total weight and the position of the center of gravity which has been predicted, such that an influence of the total weight and the position of the center of gravity on traveling of the vehicle is reduced;
distributing the corrected motion request to the actuator system; and
moving the vehicle according to the corrected motion request, wherein
the predicting includes
  setting a travel route to a destination such that a traveling point where the influence of the total weight and the position of the center of gravity on traveling of the vehicle is reduced is included in the travel route, and
  predicting the at least one of the total weight and the position of the center of gravity when the vehicle is traveling at the traveling point where the influence on the traveling of the vehicle is reduced,
the travel route is set based on the number of the traveling points on the travel route such that the vehicle is moved through a plurality of the traveling points located along different road segments along the travel route at which the at least one of the total weight and the position of the center of gravity is predicted, and
the at least one of the total weight and the position of the center of gravity is predicted based only on information received from in-vehicle devices.

* * * * *